United States Patent [19]
Woods

[11] Patent Number: 5,881,311
[45] Date of Patent: Mar. 9, 1999

[54] DATA STORAGE SUBSYSTEM WITH BLOCK BASED DATA MANAGEMENT

[75] Inventor: Harold L. Woods, Colorado Springs, Colo.

[73] Assignee: FaStor Technologies, Inc., Colorado Springs, Colo.

[21] Appl. No.: 658,466

[22] Filed: Jun. 5, 1996

[51] Int. Cl.$^6$ .............................. G06F 13/12; G06F 13/14
[52] U.S. Cl. ........................... 395/824; 395/823; 395/885
[58] Field of Search ..................................... 395/831, 600, 395/411; 340/825.55; 369/59; 358/432

[56] References Cited

U.S. PATENT DOCUMENTS

| | | | |
|---|---|---|---|
| 5,043,967 | 8/1991 | Gregg et al. | 369/59 |
| 5,481,255 | 1/1996 | Albert et al. | 340/825.55 |
| 5,537,585 | 7/1996 | Blickenstaff et al. | 395/600 |
| 5,566,316 | 10/1996 | Fechner et al. | 395/411 |
| 5,717,497 | 3/1995 | Suzuki et al. | 358/432 |
| 5,717,951 | 8/1995 | Yabumoto | 395/831 |

OTHER PUBLICATIONS

Advertisement for Hitachi "Optical Jukebox System A–6967 Series".
Advertisement for Cranel "Network Optical File Server".
Advertisement (Product Description) for Ten X "ONEserver™".
Advertisement for FileTek "The Storage Machine™".
Advertisement for Hewlett–Packard "SureStore Optical 20xt LAN Jukebox".
Advertisement (Fact Sheet) for Hewlett–Packard "Jukebox MO™ Manager".
Advertisement for Maxoptix "P60".
Advertisement for U.S. Design "TurboMASS™".

*Primary Examiner*—Ayaz R. Sheikh
*Assistant Examiner*—Omar A. Omar
*Attorney, Agent, or Firm*—Duft, Graziano & Forest, P.C.

[57] ABSTRACT

The block based data storage subsystem combines the functions of data storage/retrieval with block based data management functions, including but not limited to: Hierarchical Storage Management (HSM), Live Data Backup, Fault Tolerance, Capacity Planning, Performance Optimization and Dynamic Load Balancing. This system solves many storage management problems with a single technology and is completely independent from, and non intrusive to, the system it attaches to and has resources specifically designed to perform data management functions. The perspective of block data management is a much finer granularity and much simpler than existing data file based technologies.

33 Claims, 27 Drawing Sheets

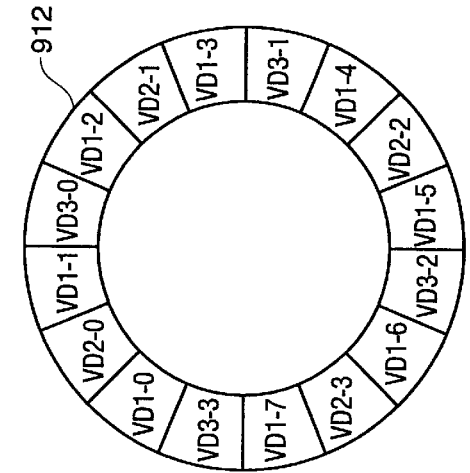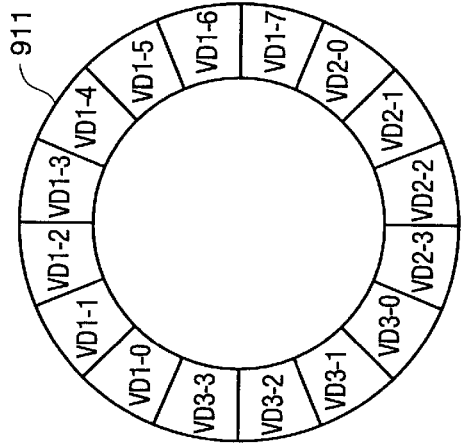

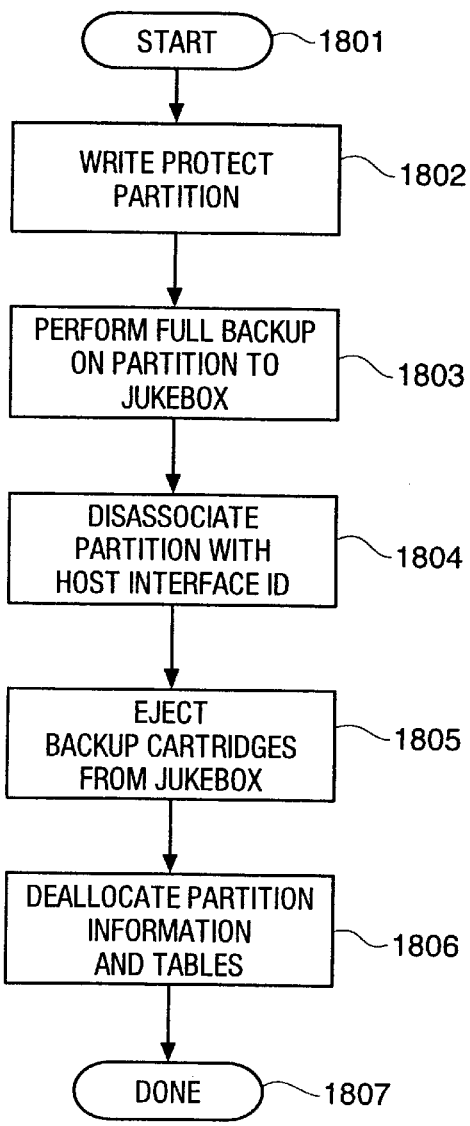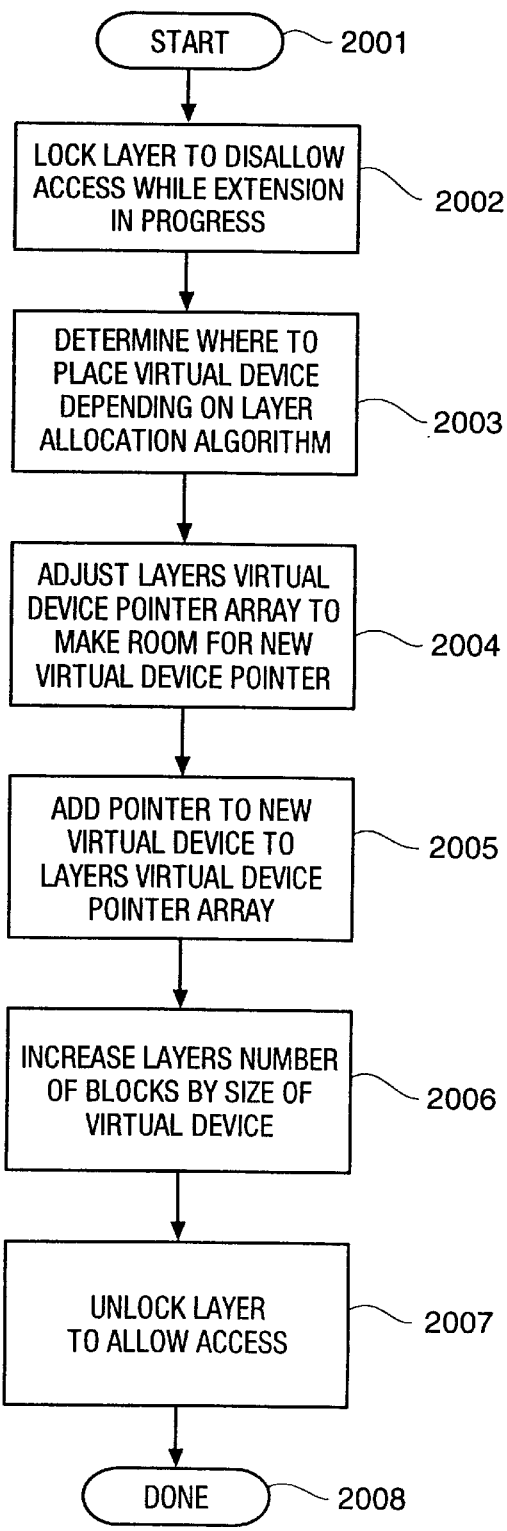

DATA STORAGE SUBSYSTEM WITH BLOCK BASED DATA MANAGEMENT

FIELD OF THE INVENTION

This invention relates to data storage subsystems and, in particular, to a data storage subsystem which combines the functions of data storage/retrieval with block based data management functions, including but not limited to: Hierarchical Storage Management (HSM), Live Data Backup, Fault Tolerance, Capacity Planning, Performance Optimization and Dynamic Load Balancing.

PROBLEM

It is a problem in the field of data storage subsystems to concurrently address the problems of hierarchical storage management, live data backup, fault tolerance, capacity planning, performance optimization and dynamic load balancing to thereby provide the user with superior data storage management. In fact, existing data storage subsystems do not address the problems of dynamic load balancing and capacity planning, even though they are industry recognized problems, and only inadequately address the problems of hierarchical storage management, live data backup, fault tolerance, and performance optimization. Therefore, existing data storage subsystems fail to provide the user with the desired integrated and coordinated data storage management.

There are a number of technical difficulties with existing data storage subsystems. Presently available hierarchical storage management and live data backup systems must intrusively take over part of the operating system of the computer systems which they serve to allow them to intercept the data file storage and data file archival requests from the application programs extant on these computer systems. However, intercepting data file storage and data file archival requests is an intrusive action, and this causes significant problems, such as data corruption, if the hierarchical storage management and live data backup software are not working in synchronization. In addition, if any application program directly accesses the operating system or device drivers to store data on the data storage subsystem, the results are unpredictable. Furthermore, if the data backup or hierarchical storage management software uses tape media or other non-standard data storage devices, special (non-disk) device drivers must be added to the hierarchical storage management and live data backup systems in order for the computer system to access these devices. In addition, the hierarchical storage management and data backup software modules are located between the application programs and the device driver, which causes this software to be inherently dependent on both interfaces (application and device driver) and the restrictions of the operating system. Should the operating system change, the hierarchical storage management and data backup software must change. Fault tolerance and performance issues are typically addressed in existing data storage subsystems through the use of RAID technology. Unfortunately, RAID devices only address performance and fault tolerance on the portion of the system capacity covered by the RAID device.

Presently available data storage subsystems are therefore capable of modifying the data storage hierarchy to perform the required data storage functions but they only partially solve the problems with data management functions. The data storage subsystems provide a short term limited benefit solution to data management but introduce significant risks unless the data storage subsystems are carefully managed by the user. Because the goal of automated data management functions is to decrease the data file management burden, existing data storage subsystems are lacking because they require significant management effort.

SOLUTION

The above-described problems are solved and a technical advance achieved in the field of data storage management by the block based data storage subsystem of the present invention. The block based data storage subsystem combines the functions of data storage/retrieval with block based data management functions, which include but are not limited to: hierarchical storage management (HSM), live data backup, fault tolerance, capacity planning, performance optimization and dynamic load balancing.

In data processing systems, data files can be read, written, opened, closed, created, deleted, moved, sorted, merged, concatenated, named, renamed, have access rights and be transported from one processor to another. Data files are variable in length and are inherently tied to a set of rules which are defined by a local operating system. Additionally, a data file requires other administrative data which defines the data file's location, name, etc. Since the data file can be stored in various locations. Data file based data management systems must therefore deal with a myriad of rules and interrelationships in a complex system environment and then add data management overhead. In contrast, blocks of data can simply be read or written. Blocks are fixed in length and are inherently tied to a predefined data storage device, thereby obviating the need for the administrative data which is required for data files. The characteristics which differentiate data files from blocks are therefore primarily granularity and perspective. The block based data storage subsystem of the present invention takes advantage of these differences and deals with data management at an atomic level: the smallest piece of data accessible between a computer system and a data storage device, which is typically one sector.

The block based data storage subsystem of the present invention can be differentiated from data file based technologies in three primary ways:

1. The block based data storage subsystem solves many data storage management problems with a single technology versus having several technologies which must be integrated together.
2. The block based data storage subsystem is completely independent from and non-intrusive to the computer systems which it serves, and has resources specifically designed to perform data management functions on behalf of these computer systems.
3. The perspective of block data management is a much finer granularity and much simpler than data file management.

All data management functions are incorporated into the block based data storage subsystem, rather than residing on the computer systems which it serves. Another subtle but significant difference between existing data storage subsystems and the block based data storage subsystem approach is in the scope of the data management. Operating systems incur significant overhead in storing data files. For every data file stored there is normally other data that lists the name of the data file, its size, location(s), access rights, date created, date modified and other parameters which depend on the specific operating system executing on the computer system. This data file overhead data is stored independent of the data file. Existing data storage systems perform data management on data files but do not address data management of the data file overhead data. The block based data storage subsystem of the present invention does not differentiate between data files and data file overhead structure, thereby performing data management on all data stored by the data storage subsystem, regardless of the nature of the data.

To understand the ramifications of this architecture, consider the hierarchical data storage management and data backup functions. In a data storage subsystem with millions of data files, the overhead structures to organize the data files take up significant data storage capacity. In a data file based hierarchical storage management system, the overhead data is not part of the migration and demigration data of the hierarchical storage management system. Most data backups do not store a mirror image of the data storage subsystem but rather back up data solely on a data file basis. If a data file overhead sector, which points to the location of data files, is lost, not only does the data file become inaccessible but the data storage subsystem may not even know what data files were lost. In the block based data storage subsystem of the present invention, all data and data file overhead are migrated and demigrated as necessary, depending on the data access patterns of the computer systems. Data backup is performed on all data, regardless of whether it is a data file or data file administrative information, to ensure that the data can be recovered if data is accidentally deleted or if a catastrophic error occurs. The block based data storage subsystem, by backing up all overhead data blocks as well as data blocks associated with data files, protects all system data, not just data files.

The block based data storage subsystem, by providing the benefits of data management without affecting the well defined data access hierarchy that has evolved in modern computer systems, is significantly different than existing data file based data management techniques.

BRIEF DESCRIPTION OF THE DRAWING

FIGS. 9A–9F illustrate a diagram of the layer configuration of the hierarchical storage memory;

FIG. 18 illustrates in flow diagram form the operation of a data partition export function in the block based data storage subsystem;

FIG. 20 illustrates in flow diagram form the operation of a layer extension function in the block based data storage subsystem;

DETAILED DESCRIPTION

The block based data storage subsystem of the present invention combines the functions of data storage/retrieval with data management functions. The data management functions include hierarchical storage management, live data backup, fault tolerance, capacity planning, performance optimization and dynamic load balancing. To a computer system, the block based data storage subsystem appears as a high capacity disk drive and conforms to an industry standard disk drive interface, such as the small computer system interface (SCSI).

Existing Computer System Architecture

Figure 1:
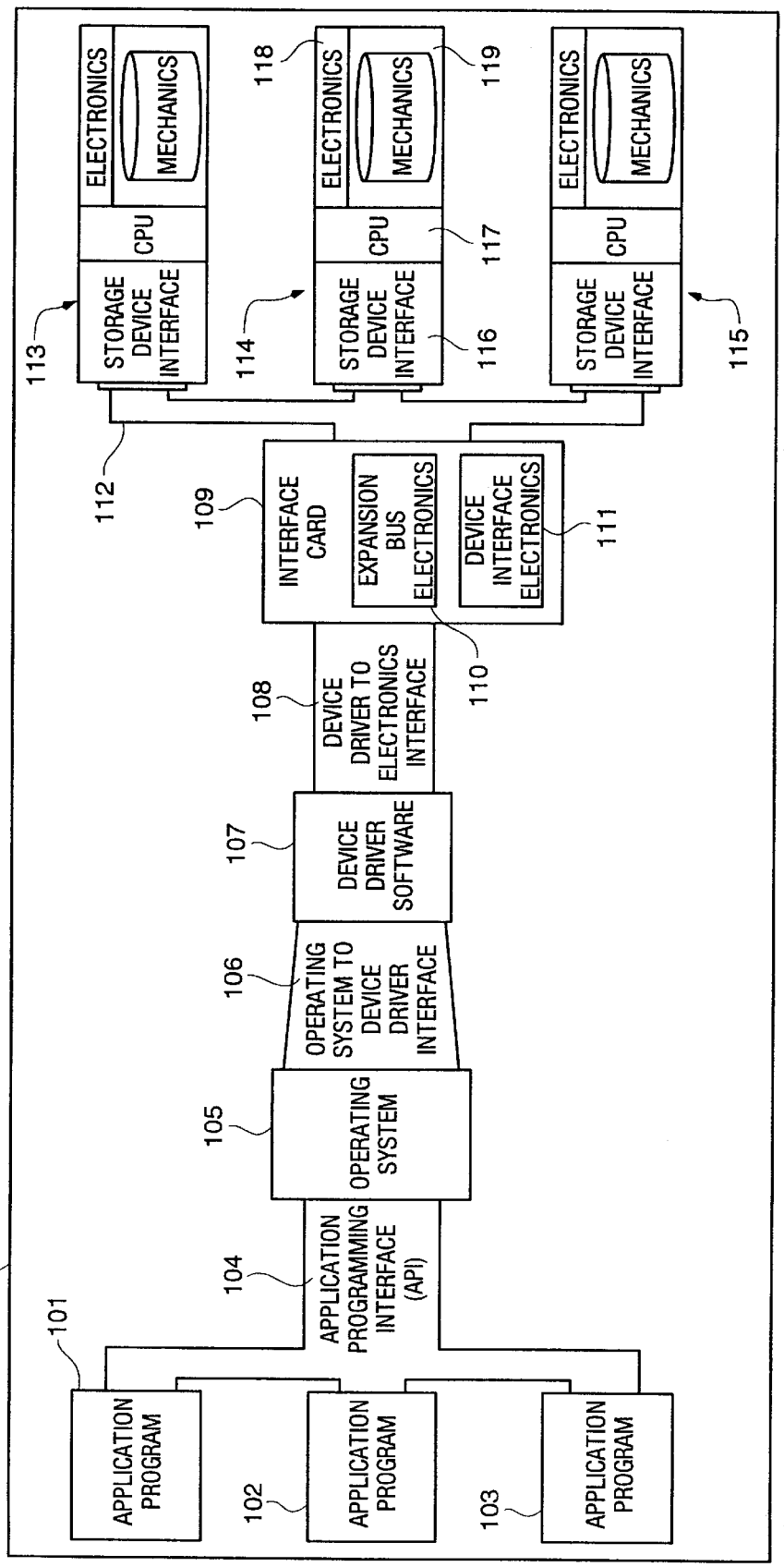
FIG. 1 illustrates, in block diagram form a typical computer system data storage and retrieval hierarchy.

FIG. 1 illustrates a typical existing computer system 100, which includes a plurality of application programs 101–103 which are interconnected with an operating system 105 via a proprietary application programming interface 104. The operating system 105 performs a data file to block conversion function to perform the required data processing operations on a retrieved data file. The data file is transmitted to backend data storage devices, such as the plurality of disk drives 113–115 illustrated in FIG. 1, via device driver software 107 which is connected to the operating system 105 by an operating system to device driver interface 106. The device driver 107 functions to translate the data and commands transmitted by the operating system 105 into signals defined by the device driver to electronics interface 108, which is specific to the particular data storage device 113–115 connected to the computer system 100. The electronics included in the typical interface card 109 used to connect the data storage device 113–115 to the computer system 100 are expansion bus electronics 110 and device interface electronics 111, which function to transmit signals in standard format to the storage device interface electronics 116 contained in the data storage device 114. The data storage device 114 includes a CPU 117 and control electronics 118 which function to operate the mechanism 119 required to read/write data on the data storage medium contained in the data storage device 114. In this architecture, there are a multitude of interfaces and only the data storage device interface 112 is an industry standard interface. This is done to insure that data storage devices of differing implementations can be attached to multiple computing platforms. An example of a typical data storage device interface 112 is the Small Computer Systems Interface (SCSI), and SCSI devices can be attached to nearly any computer system 100. Because this industry standard interface is designed to attach to varying computer systems, the data storage device interface 112 is designed to be independent of any specific operating system that runs on the computer systems.

The data storage and retrieval hierarchy illustrated in FIG. 1 is a very efficient yet robust data access hierarchy consisting of five logical levels. Between each level in the hierarchy is an interface which allows inter level processing to occur. The first level is the application level. Applications 101–103 manipulate (open, close, append . . . ) data files and should not be concerned with the mechanics of how the data files are manipulated. The second level is the operating system. The operating system 105 provides a data file to block conversion process, based on the rules of the data file system implemented by the operating system, between the applications data file based request and the block based processes necessary to satisfy the request. The operating system 105 should not be concerned with the specifics of accessing the electronics which interface to the storage device. The third level is the device driver. The device driver 107 provides a conversion from an operating system request into the instructions for the electronics interfaced to the data storage device 113–115 to access the data storage device 113–115. The device driver 107 should not be concerned with the specific electrical interface between the interface electronics 109 and the data storage device 113–115. The fourth level is the interface electronics. The interface electronics 109 converts the device driver request into the electrical signals necessary to access the data storage device 113–115. The interface electronics 109 should not be concerned with how the data storage device 113–115 performs the access. The fifth level is the data storage device 113–115. It performs the requested actions as received across the data storage device interface 112 from the interface electronics 109.

Existing Data Storage Management Systems

Figure 2A:
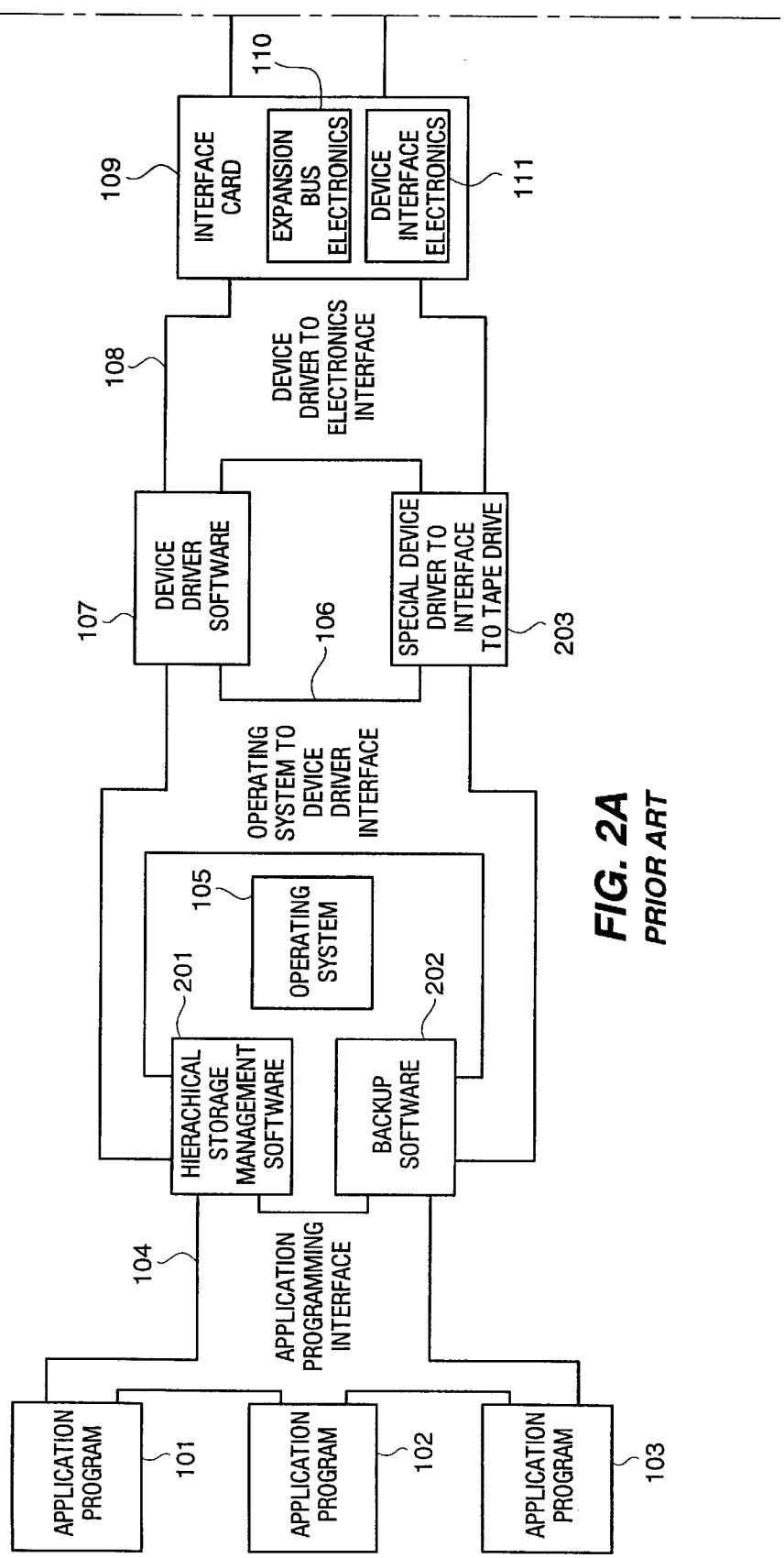
FIGS. 2A and 2B illustrate, in block diagram form, the computer system of FIG. 1 with the addition of a hierarchical data storage management system.
Figure 2B:
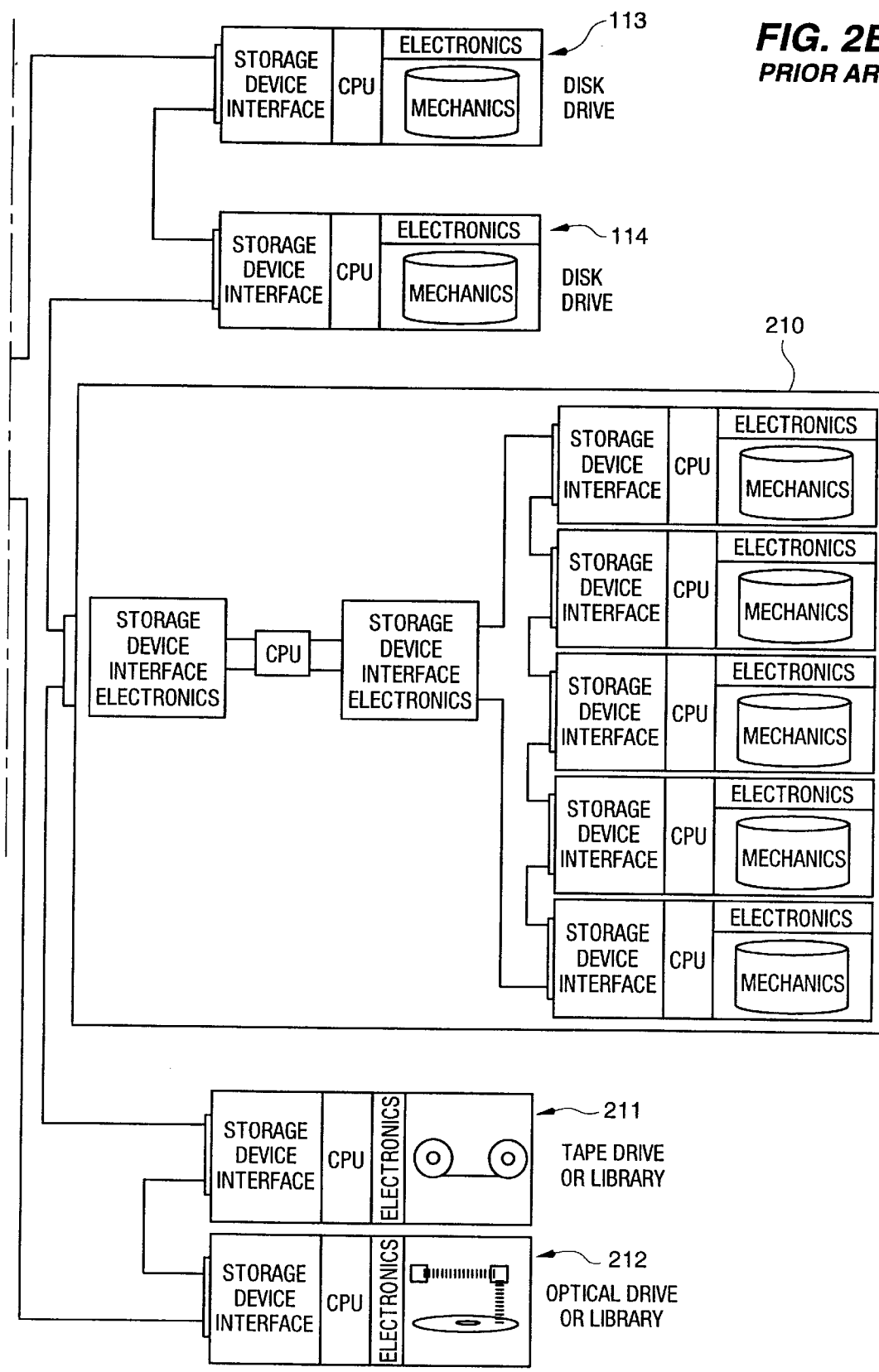

The data storage and retrieval hierarchy described in FIG. 1 has evolved over many years. This basic hierarchy is found in Unix, Novel Netware, DOS, OS/2, MacOS and other operating systems. It is very efficient and allows any of the five levels to be changed (new versions, improved, fixed) without affecting the other levels, so long as the inter level interface is unchanged. This is critical in an industry that changes rapidly, allowing changes in technology to occur at each level independent of other levels. Unfortunately during this evolution, this hierarchy did not address data management issues. These issues include:

Hierarchical Storage Management (HSM)
Live Data Backup
Fault Tolerance
Performance Optimization
Dynamic Load Balancing
Capacity Planning The system illustrated in block diagram form in FIGS. 2A, 2B represents the modifications made to existing computer systems and their backend data storage to address hierarchical storage management, live data backup, fault tolerance and performance data management functions. Dynamic load balancing and capacity planning are not addressed by these existing systems, even though they are industry recognized problems. The apparatus illustrated in FIGS. 2A, 2B represent a typical hierarchical storage management facility which comprises a plurality of types and levels of data storage elements. A RAID subsystem 210, a robotic tape storage library system 211 equipped with a plurality of tape drives, and an optical tape storage facility 212 are added in parallel with the existing disk drives 113, 114 to provide four levels of data storage in this example. Data files are migrated from the disk drives 113, 114 which serve the computer system 100 to either the high performance and fault tolerant RAID data storage subsystem 210 or the less expensive and slower magnetic tape media 212 or optical media 213 which provide extended data storage capacity for the computer system 100. In many cases, the data files are stored on the RAID data storage subsystem 210 and then migrated to the optical media 211 and thence to the magnetic tape media 213, as the data files age. This architecture is presently found in many existing hierarchical management systems.

Existing hierarchical storage management and live data backup systems must intrusively take over part of the operating system to allow them to intercept the data file storage and data file archival requests from the application programs. In particular, these systems include software modules, such as the hierarchical storage management software 201 and backup software 203 illustrated in FIG. 2. These software modules are interposed between the application programs 101–103 and the operating system 105 to enable these software modules to monitor the communications between the application programs 101–103 and the operating system 105 and to intercept any data file storage and data file archival requests. However, intercepting data file storage and data file archival requests is an intrusive action, and this causes significant problems, such as data corruption, if the hierarchical storage management software 201 and data backup software 202 are not working in synchronization. If any application program 101 directly accesses the operating system 105 or device drivers 107 to store data files on a data storage subsystem, the results are unpredictable. If the data backup software 202 or hierarchical storage management software 201 uses tape media 211 or other non-standard data storage devices 212, special (non-disk) device drivers 203 must be added in order for the computer system 100 to access these devices. Because the hierarchical storage management software 201 and data backup software 202 are located between the application programs 101–103 and the device driver 107, the hierarchical storage management software 201 and data backup software 202 are inherently dependent on both interfaces (application 104 and device driver 106) and the restrictions of the operating system 105. Should the operating system 105 change, the hierarchical storage management software 210 and data backup software 202 must also change.

Fault tolerance and performance issues are typically addressed in existing data storage subsystems through the use of RAID technology in the form of a backend RAID data storage subsystem 210. Unfortunately, RAID devices only address performance and fault tolerance on the portion of the system capacity covered by the RAID device. Existing data storage subsystems, by modifying the data storage hierarchy and only partially solving data management problems, provide a short term limited benefit solution to data management with significant risks unless carefully managed. Because the goal of automated data file management functions is to decrease the data management burden on the computer system, existing data storage subsystems are lacking because they require significant data file management effort.

Data Storage Architecture of the Block Based Data Storage Subsystem

Figure 3A:
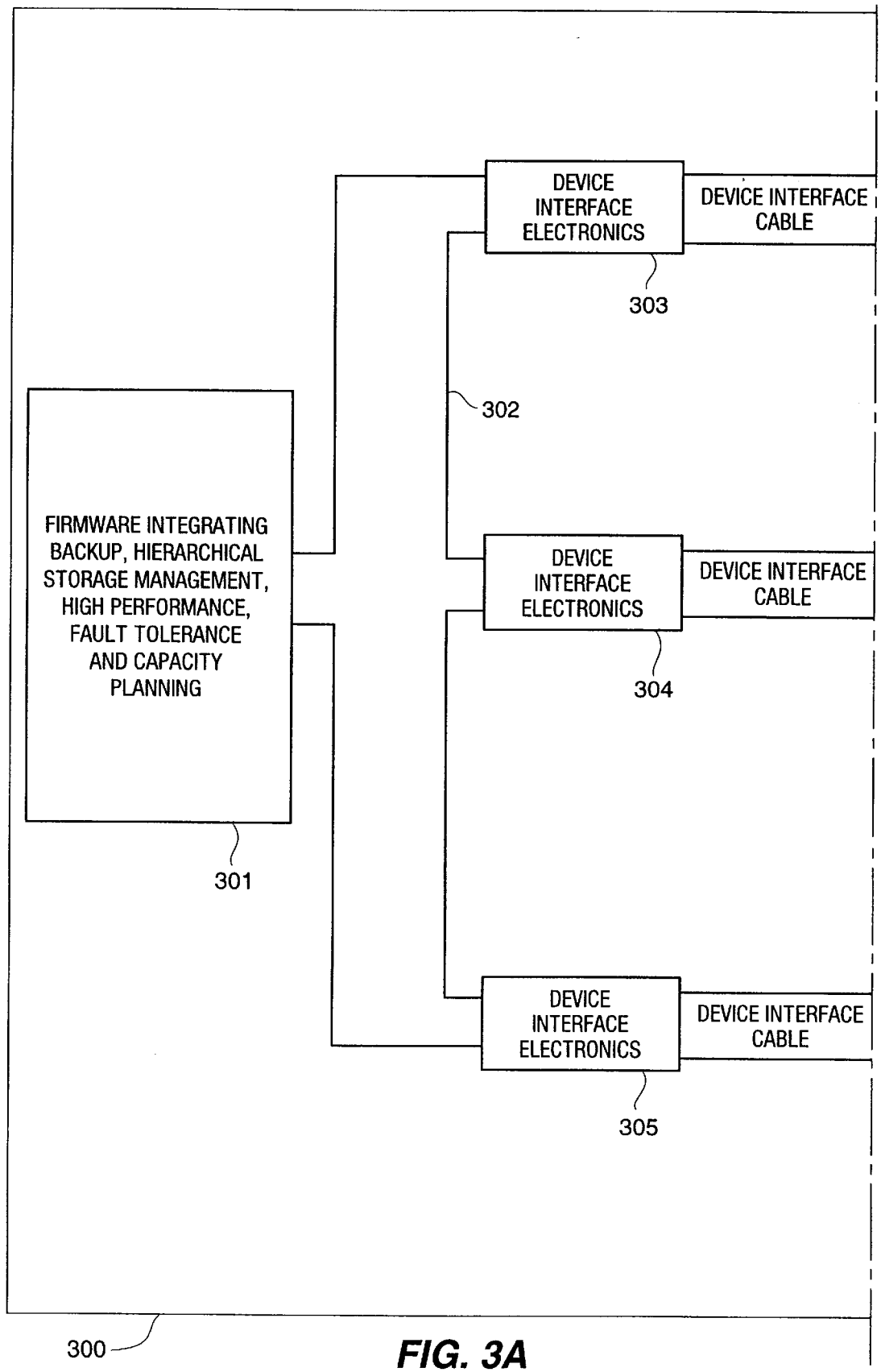
FIGS. 3A and 3B illustrate, in block diagram form, the data storage subsystem, with block based data management, of the present invention.
Figure 3B:
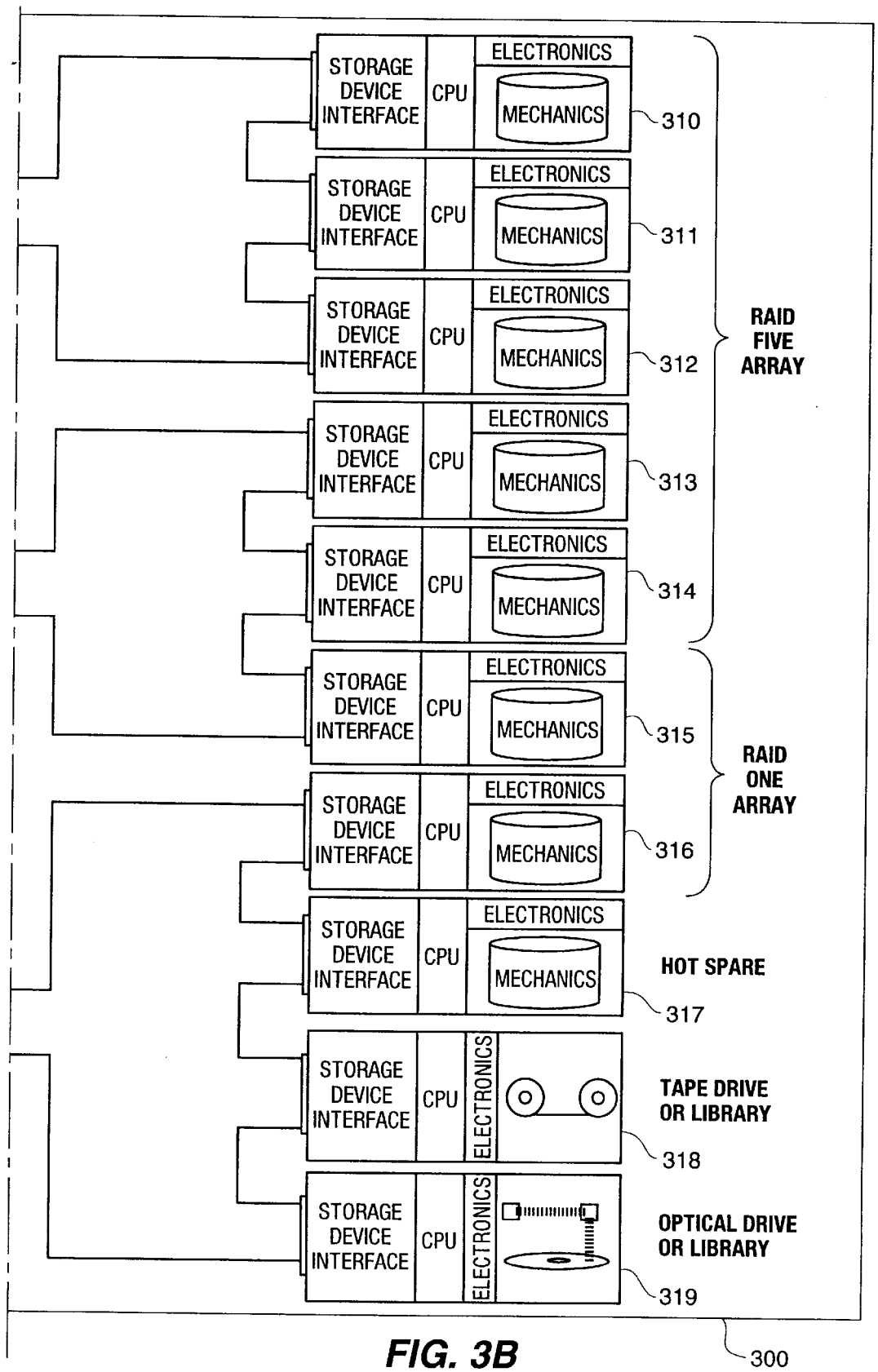

FIGS. 3A, 3B show the block based data storage subsystem 300 of the present invention, which can be attached to the computer system 100 of FIG. 1 in place of the hierarchical storage management system and backup storage system of FIGS. 2A, 2B. The hierarchy of data storage described with reference to FIG. 1 remains unchanged in the block based data storage subsystem 300 of FIGS. 3A, 3B. The block based data storage subsystem 300 simply replaces the disk drives 111–113 attached to the computer system 100 in a transparent manner with the multitude of data storage devices 310–319. All data management functions previously performed by software operational on the computer system 100 or existing hierarchical storage management systems 201 or data backup systems 202 are moved outboard from the computer system 100 and incorporated into the processing element 301 (termed system electronics below) of the block based data storage subsystem 300. The processing element 301 interfaces the computer system 100 via a data storage device interface so that the block based data storage subsystem 300 appears to the computer system 100 as a large, seamless memory. The processing element 301 is interconnected via bus 302 with a plurality of device interface electronics elements 303–305, each of which serves to interface a plurality of the data storage devices 310–319 with the system bus 302. The data storage devices used in the block based data storage subsystem 300 can be identical units or a variety of units. For the purpose of illustration, the data storage devices 310–319 as shown as disk drives 310–317 which are configurable as RAID 5 array configurations (310–314) or RAID 1 configurations (315, 316) or as spare disk drives 317 as examples. In addition, this architecture supports tape drives or tape library apparatus 318 as well as optical drives or optical library apparatus 319. Other memory devices or combinations of memory devices can also be used and the elements and configurations disclosed herein are simply for the purpose of illustration, not limitation. Suffice it to say that the plurality of data storage devices 310–319 are interconnected to the computer system 100 by the processing element 301, which processing element includes the firmware required to automatically provide the data management functions, including but not limited to: Hierarchical Storage Management (HSM), Live Data Backup, Fault Tolerance, Capacity Planning, Performance Optimization and Dynamic Load Balancing.

The block based data storage subsystem 300 of the present invention also does not differentiate between data files and data file overhead structure, thereby performing data management on all data stored by the data storage subsystem, regardless of the nature of the data. The block based data storage subsystem 300, by backing up all overhead data blocks as well as data blocks associated with data files, protects all system data, not just data files. The block based data storage subsystem 300, by providing the benefits of data management without affecting the well defined data access hierarchy that has evolved in modern computer systems is significantly different than data file based data management techniques.

Hardware Architecture

Figure 4A:
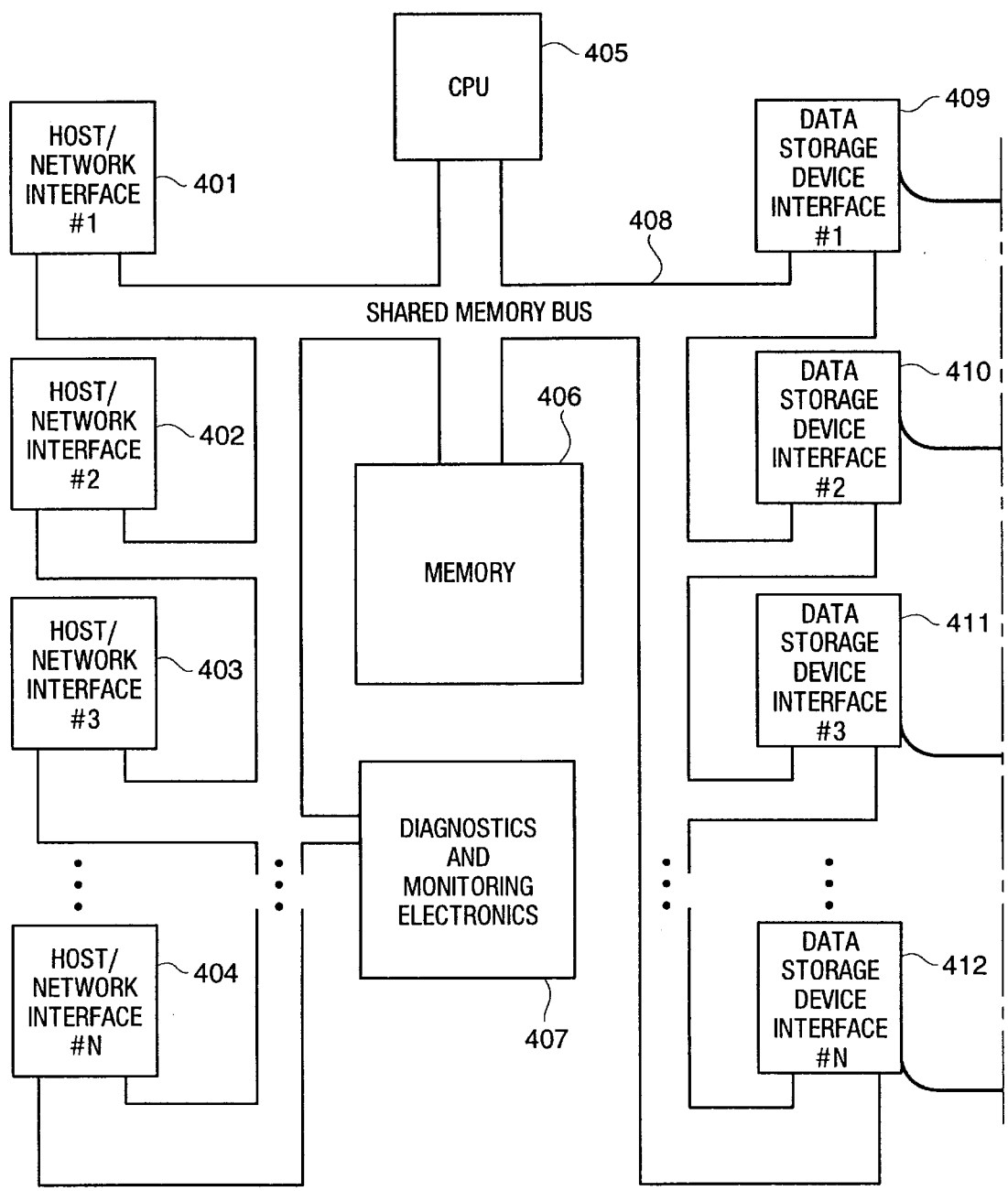
FIGS. 4A and 4B illustrate, in block diagram form, the architecture of the block based data storage subsystem.
Figure 4B:
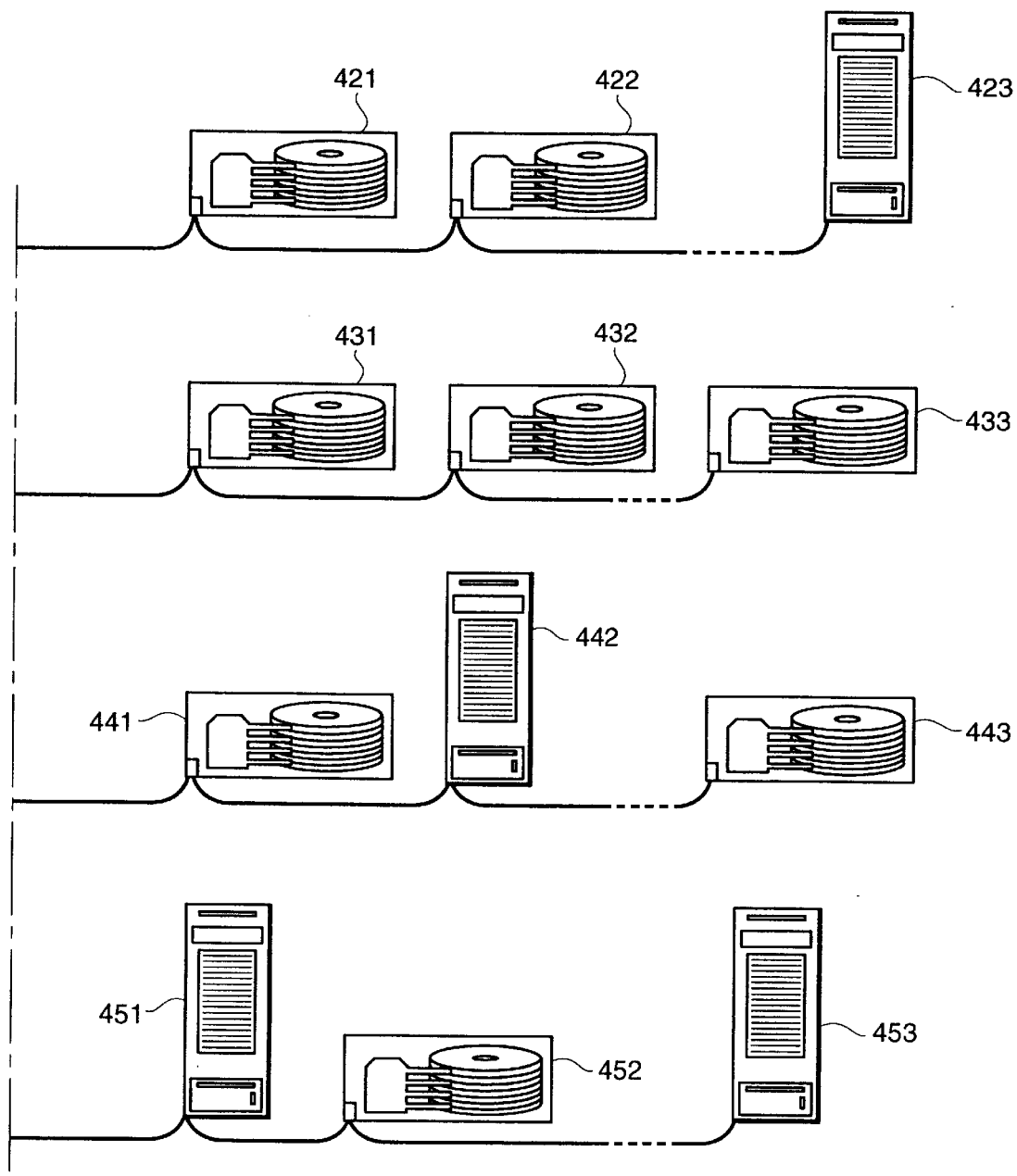

The hardware of the block based data storage subsystem is comprised primarily of common, off the shelf, components. The primary benefits of the block based data storage subsystem hardware are not in the components used to implement the block based data storage subsystem, but in how these components are combined and the control firmware which manages the data stored thereon. The basic architecture of the system electronics 400 (processing element 301 of FIG. 3A), as shown in FIGS. 4A, 4B, is very simple. The electronics implement a Peripheral Component Interconnect (PCI) and an Industry Standard Architecture (ISA) expansion bus. The PCI bus provides a high performance (132 megabytes per second) interface and supports multi-processing. The ISA bus is a slower performance bus but has tremendous support for expansion via third party developers. The PCI bus is used for the storage interface and the ISA bus is used for the diagnostics and monitoring interfaces. The system has three to four PCI expansion slots and three to four ISA expansion slots. Each PCI slot can be configured with one to five interface channels. Depending on the interface channel type, an interface channel may be a network connection, data storage device connection or may be configured as either one.

There are one or more host/network interface channels 401–404, one or more data storage device interface channels 409–412, diagnostics/monitoring electronics 407, memory 406 and a microprocessor (CPU) 405, all of which are interconnected via shared bus 408. The goal of the system electronics 400 is to achieve performance and reliability through the use of redundant components which are capable of performing their own processing. The main CPU 408 primarily coordinates and monitors the activity of other system hardware components, trying to keep as many hardware components working in parallel as possible. Each of the data storage device interface channels 409–412 supports a plurality of data storage devices. For example, data storage device interface channels 409 and 411 support two disk drives and a robotic magnetic tape cartridge library system 421, 422, 423 and 441, 443, 442, respectively. Data storage device interface channel 410 supports three disk drives 431–433, while data storage device interface channel 412 supports two robotic magnetic tape cartridge library systems 451, 453 and a disk drive 452. It is apparent from this architecture that numerous data storage devices of differing characteristics can be interconnected via the data storage device interface channels 409–412. The CPU 405 contains the firmware (described below) which performs the data management functions, including but not limited to: Hierarchical Storage Management (HSM), Live Data Backup, Fault Tolerance, Capacity Planning, Performance Optimization and Dynamic Load Balancing.

Network Perspective

Figure 5:
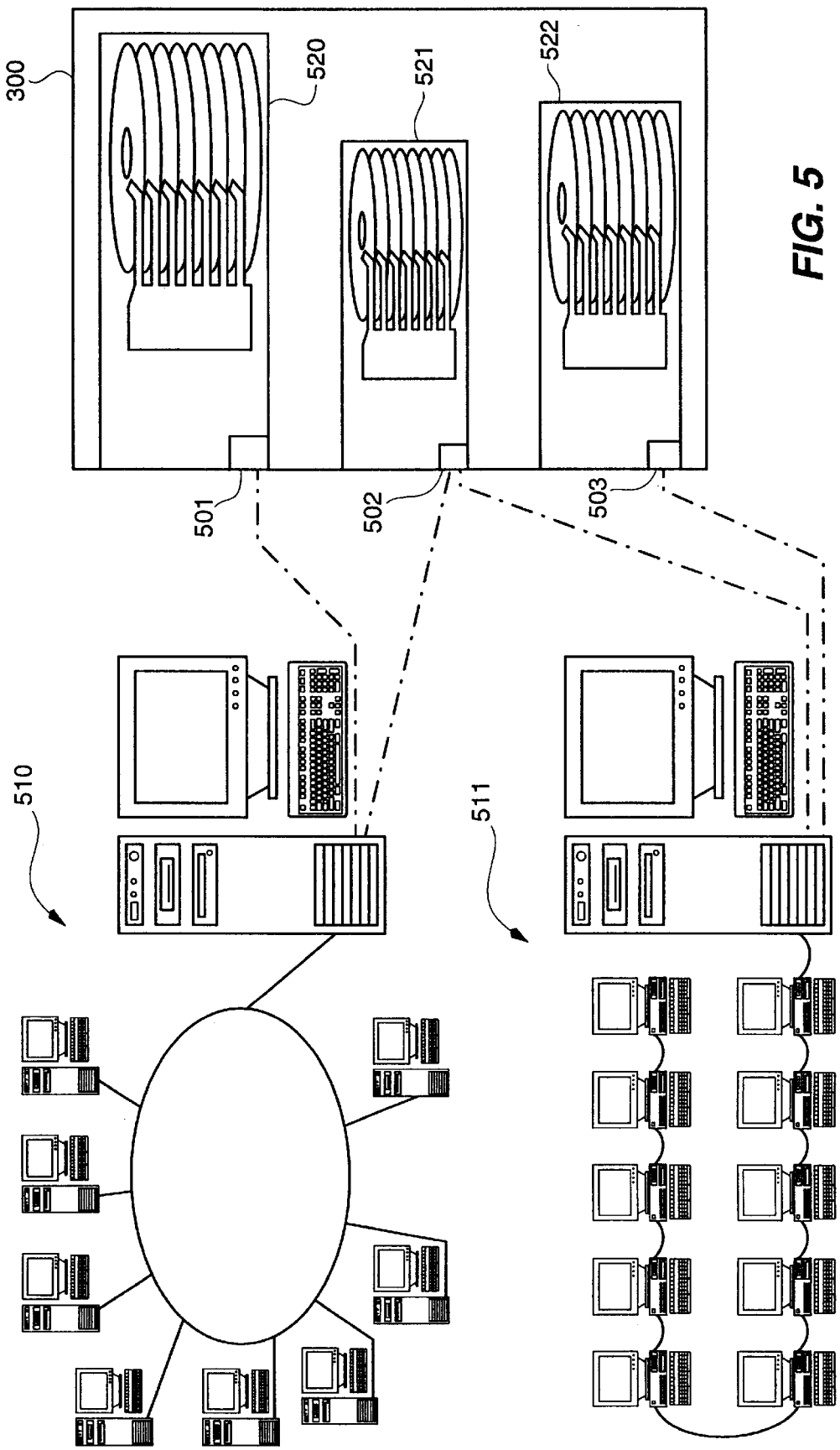
FIG. 5 illustrates, in block diagram form, the network perspective of the block based data storage subsystem

FIG. 5 illustrates, in block diagram form, the network perspective of the block based data storage subsystem 300. FIG. 5 illustrates two typical networks, a first of which is a UNIX network 510 comprising a token ring architecture wherein multiple computer systems are connected to the token ring network, which network is managed by a network server. A second network is a typical Novell network 511 which serially interconnects the plurality of computer systems and which network is managed by a network server. The block based data storage subsystem 300 is designed to appear as multiple logical devices 520–522 and has multiple network connections 501–503 to interconnect with the network servers. If a disk interface protocol, such as SCSI, is implemented which supports multiple host (network) connections, the block based data storage subsystem 300 supports multiple network connections to a logical device. For example, network 510 is connected via interface 502 to logical device 521, while network 511 is connected via interface 502 to the same virtual device 521. The block based data storage subsystem 300, because it is a block interface device, is independent of the network topology, operating system and software running on the network. As advancements are made in networks and software, the block based data storage subsystem 300 can connect to new and older technology alike.

Firmware for the Block Based Data Storage Subsystem

Figure 6:
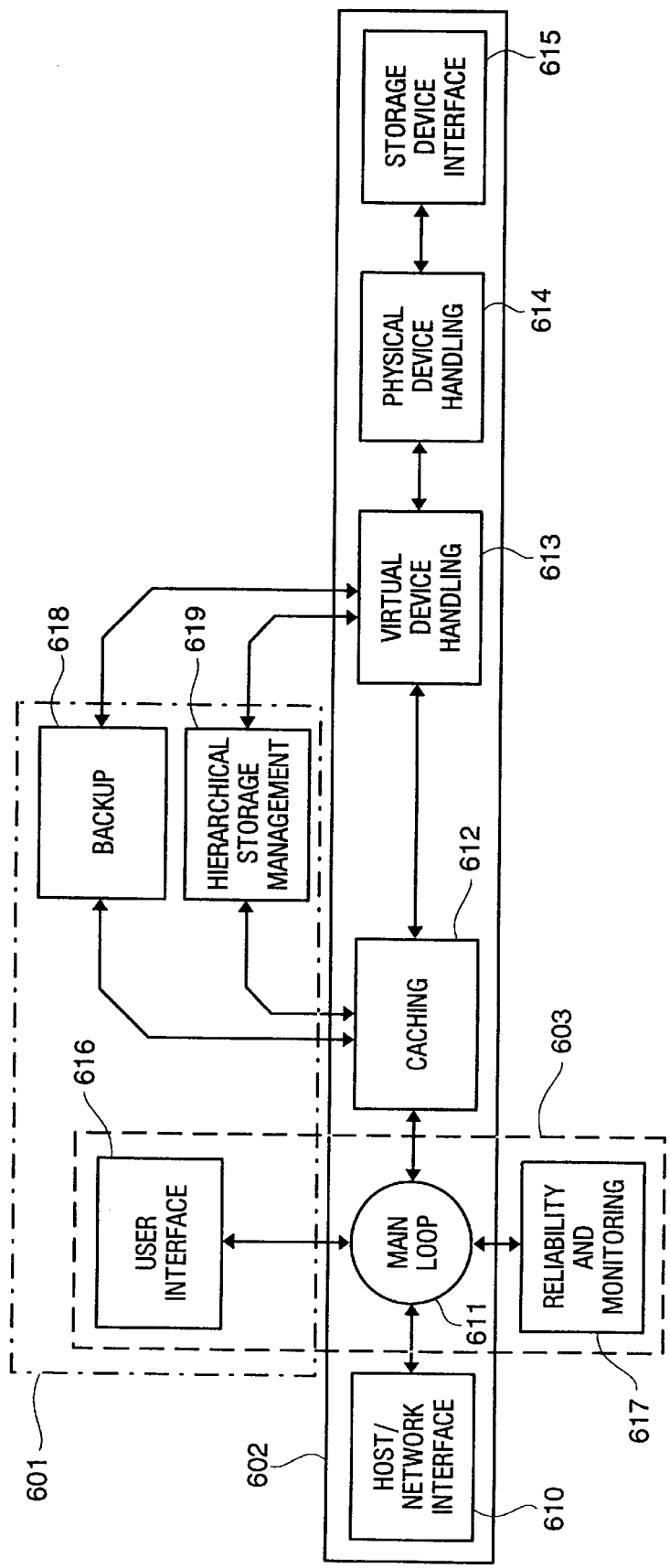
FIG. 6 illustrates a conceptual look at the critical paths that exist in the firmware.

The block based data storage subsystem firmware and hardware architecture supports the four primary goals of data storage subsystems: high performance, fault tolerance, integrated data management (hierarchical storage management, data backup, etc.) and integrated system management (configuration, expansion) functions. A key consideration in the system design is the requirement that the system be dynamically alterable. This requirement is readily supported in hardware via modular rack mount components, but the firmware must be specifically designed to support the dynamic nature of the block based data storage subsystem 300. In the firmware design, the functions in the firmware that tend to reduce performance (system management, data management and fault tolerance) are isolated so that they are only performed as needed or when idle time exists in the data storage subsystem. This design method allows as much possible bandwidth to be available to address the system performance but still allows the implementation of robust fault tolerance, data and system management functions. FIG. 6 provides a conceptual look at the critical paths that exist in the firmware. In this description, system management is not shown as system management but is a combination of fault tolerance and data management joined through the user interface. FIG. 6 illustrates in schematic form the three critical paths in the firmware: data management 601, fault tolerance 603 and performance 602. This diagram shows how the firmware is organized. In a system which is performing tasks with significant different purposes, some of which conflict, it is important to show that the interrelations of the tasks are minimized so as to prevent side effects if one area is changed. FIG. 6 illustrates that the performance path 602 is designed to have minimal obstacles while the other paths (data management 601, fault tolerance 603), which occur infrequently, can be executed as needed but still with minimal impact to the performance path 602.

Thus, the performance path 602 represents the traditional data storage operational architecture wherein the host/network interface function 610 interfaces with the computer system 100 or the networks 510, 511 as described above. The main loop process 611 manages the data flow between the host/network interface process 610 and the data storage backend processes 612–615. The data storage backend processes 612–615 comprise a cache management process 612 which provides temporary data storage to interconnect the host/network process 610 with the virtual device handling process 613. The virtual device handling process 613 presents the desired data storage image to the computer system 100 (or networks 510, 511) while translating the virtual device image to the physical data storage device implementation as provided by the physical device handling process 614. Finally, the storage device interface 615 is provided to manage the physical interface with the data storage device attached to the particular data storage device interface 411–414. This performance path 602 operates in a traditional manner to implement a cached virtual data storage subsystem. The reliability and fault tolerance path 603 operates to provide a user interface process 616 and reliability and monitoring process 617 for the block based data storage subsystem 300, and is activated via the main loop 611. The reliability and fault tolerance path 603 is shown as overlaying the performance path 602 as well as the data management path 601. The data management path 601 functions to provide the data backup 618 and hierarchical storage management 619 functions (as well as other data management functions noted above) and operates as an adjunct to the performance path 602. In particular, the data management path 601 is shown as having the data backup 618 and hierarchical storage management 619 functions bridging the cache management process 612 and the vitual device handling process 613 to monitor the data storage and retrieval activity that takes place in the performance path 602. The data backup 618 and hierarchical storage management 619 functions thereby do not burden the operation of computer system 100 as in the prior art as shown in FIG. 2, but are implemented outboard in the block based data storage subsystem 300. The location of the data management path 301 in the CPU 405, architected as shown in FIG. 6, enables the data backup 618 and hierarchical storage management 619 functions to initiate their operations and control the storage of data in the data storage devices 310–319 independent of the computer system 100 and in a manner that is transparent to the computer system 100. Thus, the data storage image presented to the computer system 100 is defined by the block based data storage subsystem 300 and the implementation of this image, in terms of virtual data storage devices and data backup devices, is controlled exclusively by the block based data storage subsystem 300.

The design of the firmware data structures is crucial to both the dynamic adaptability and the performance of the block based data storage subsystem 300. The firmware uses both significant memory resources and simple data structures to allow fast access to information and to prevent running complex calculations, running searching algorithms or storing data structures on data storage devices 310–319. The two primary data structures used in this system are arrays and linked lists. Arrays are a collection sequentially addressable like elements. Arrays are utilized for data that is, for the most part, static, including: segments, virtual devices, layers, host and network interfaces. Linked lists are a type of array in which each element is logically linked to other elements based on some algorithm. Linked lists allow rapid insertion, removal and sorting of the elements in the linked list because they only require logical memory management rather than moving large blocks of physical memory. Linked lists are utilized for defining data that changes order in an unpredictable manner including: command queues, memory cache and data transfer queues. Using these two simple data structures allows a few common data structure maintenance algorithms to be employed throughout the system.

Multi-Tasking

In viewing the system electronics architecture of FIGS. 4A, 4B, it is apparent that the main CPU 405 in the block based data storage subsystem 300 is in the middle of many other processors. Requests are received from the network or computer systems and, through various algorithms in the block based data storage subsystem firmware, satisfied by accessing the data storage devices 310–319. For the block based data storage subsystem 300 to achieve the required performance and reliability, the block based data storage subsystem 300 must be able to access multiple data storage devices 310–319, respond to the user interface and react to environmental electronics requests simultaneously. It is important to understand that this does not change the fundamental algorithms implemented by the block based data storage subsystem 300, but implies that several algorithms may be running at a given time and a given algorithm may be running several copies.

As an example, consider a block based data storage subsystem 300 with two network connections 501, 502 and at least two disk drives 520–522, as illustrated in FIG. 5. If a data read command is received from one network connection 501 and the data must be retrieved from a disk drive 520, the command to read the data is sent to the disk drive 520. While the disk drive 520 is performing the seek operation to retrieve the requested data, another data read command is received from the other network connection 502 and that data is on another disk drive 521 in the block based data storage subsystem 300. Rather than wait for the first disk drive 520 to complete its read operation, the block based data storage subsystem firmware sends the second received data read command to the second disk drive 521. Two copies of the data read algorithm can therefore be concurrently executing in the block based data storage subsystem 300. Depending on the location of the data and the performance of the disk drives, it is not uncommon for the second disk drive 521 to finish before the first disk drive 520 has retrieved the requested data. The block based data storage subsystem 300 processes commands in the order that they progress, not in the order they are received from the requesting device. In the block based data storage subsystem 300, this concept is extended to allow many tasks, both different tasks and multiple copies of the same task to run concurrently.

System Command Queue

Figure 7:
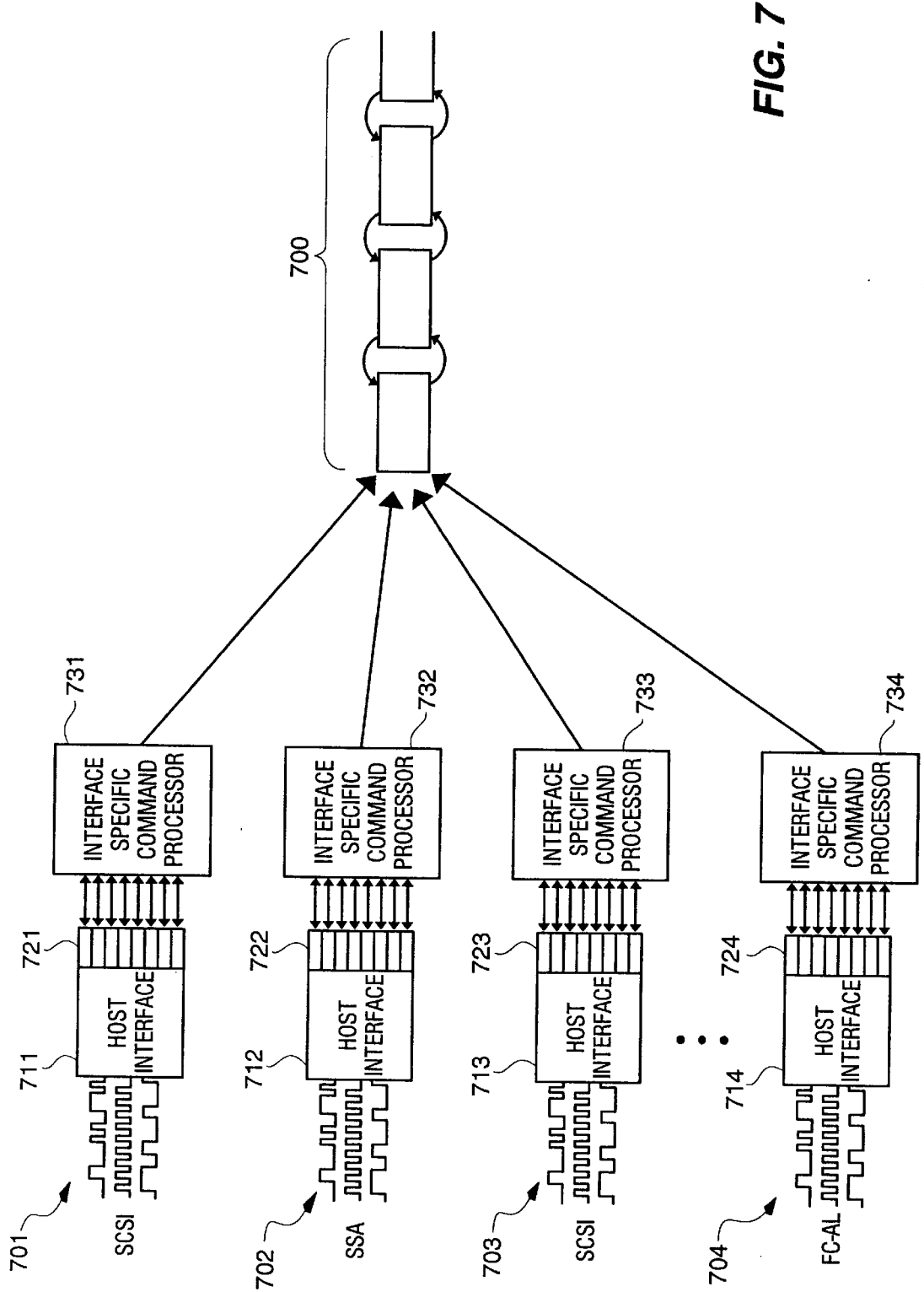
FIG. 7 illustrates in block diagram form, the operation of the system command queue.

The system command queue is a queue of all of the current commands (tasks) in the block based data storage subsystem 300 executing at any given time on CPU 405. FIG. 7 illustrates the operation of the system command queue in conceptual form, wherein each host/network interface 701–704 has its own processing electronics and firmware to receive and validate commands from the computer system (not shown) which is attached thereto The host interfaces 701–704 each include a host interface electronics module 711–741 which functions to interface the specific protocol for the attached computer system/network. As noted on FIG. 7, there can be interfaces for may different protocols, with Small Computer Systems Interface (SCSI), Serial Storage Architecture (SSA) and Fiber Channel Arbitrated Loop (FC-AL) being shown as examples of typically used interfaces. The host interface electronics module 711–714 receives the electronic signals from the computer system/network and converts these signals into commands and data which are stored in the plurality of firmware readable registers 721–724 which are included in the host interface electronics modules 711–714. Once received commands that are stored in the registers 721–724 are validated by the interface specific command processor 731–734, if room exists in the system command queue 700, the command is started as a task. This is accomplished by the interface specific command processor 731–734 entering the command into available memory locations 700A–700D which comprise the system command queue 700. Additional tasks can also be entered into the system command queue 700 when performing data migration, backup, error recovery and when responding to the user interface. A linked list is used for the system command queue 700 because tasks can widely vary in execution time so sorting performance is important.

Partitions

Figure 8:
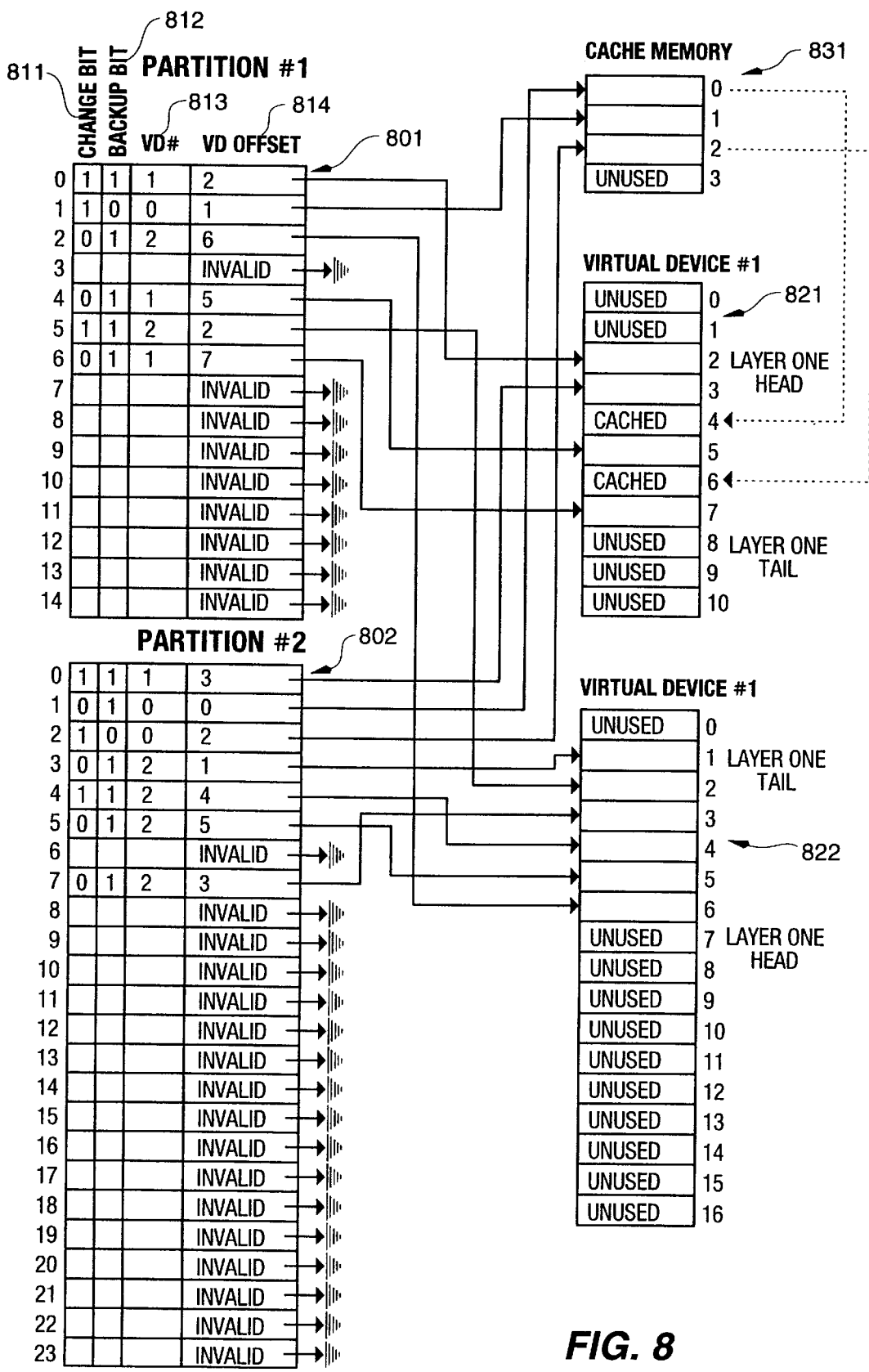
FIG. 8 illustrates partition segment tables used in the block based data storage subsystem.

Partitions provide the conversion between the computer system view of a data storage device and the block based data storage subsystem view of data storage, which is implemented via a plurality of data storage devices 310–319. The computer system 100 views a disk drive as a large array of fixed size blocks. Partitions are the data structures and algorithms that support conversion from a large linear array of fixed size blocks to the storage hierarchy implemented by the block based data storage subsystem 300. The Segment Table is the primary structure that supports this conversion. FIG. 8 illustrates two segment tables 801–802, which themselves are large linear arrays just as a disk drive, and are used to convert from a disk drive perspective to the data storage hierarchy of the block based data storage subsystem 300. The segment tables 801–802 contain a plurality of segment entries, 0–14 in segment table 801 and segment entries 0–23 in segment table 802. Each segment entry in the segment table 801–802 has four primary components. The changed bit 811 is an indication that this data segment has been changed (a write has occurred) since the last time a backup occurred. The backup bit 812 indicates, when a backup is in progress, that the segment has been backed up and may now be modified. The virtual device number 813 is a pointer to the virtual data storage device that contains the data (to allow fast cache lookup, a special virtual device number is assigned to the cache). The virtual device offset 814 is the location on the virtual device where the segment is stored.

Several important concepts are apparent in FIG. 8. First, partition one and two represent a total of 39 segments, but only 28 segments of virtual device storage are available, as noted by the virtual device tables 821, 822. In the segment tables 801, 802, when a segment is listed as invalid, a special virtual device offset is placed in the table. Any segment that has not been written is considered invalid and takes up no physical space on a virtual device. This allows there to be more logical (partition) space than physical (virtual device) space. The block based data storage subsystem 300 can easily track the amount of used physical space versus logical space by using counters that increment every time a segment goes from invalid to being written and vice versa. When the logical space used by the block based data storage subsystem 300 approaches the available physical space, more physical space can be added. Adding physical space is simple and, since this addition of physical space is transparent to the computer systems/networks and it requires no change to the network or operating system. The physical space is added to the structures illustrated in FIG. 8 by the creation of additional virtual device tables 821, 822 or the extension of the existing virtual device tables 821, 822

Cache

Both operating systems and data storage subsystems have used caching for many years to increase performance by storing data on a faster, but intermediate, storage medium. There are three primary considerations with caching: sorting method, searching method and allocation method. The block based data storage subsystem 300 employs widely used sorting and allocation methods called Least Recently Used (LRU) in managing the cache memory (part of 406). LRU maintains the data as a linked list. When a segment is accessed, it is moved to the head of the list. When a segment is needed it is taken from the back of the list. This method is used because it works well in typical network environments and has minimal overhead. Most cache methods employ a searching algorithm to determine if a given segment is cached. Referring to FIG. 8, the partition tables

801, 802 point directly to a cache location in the cache memory table 831. This allows the block based data storage subsystem 300 to quickly and efficiently know the location of cached data.

Layers

Layers are integral to the three primary data management functions of the block based data storage subsystem: backup, hierarchical storage management and dynamic expansion. A layer is simply a tier in the normal representation of a hierarchical storage management system. Backup is integral to layering, because backup occurs by layer to insure that recently used data is backed up first. Backing up using this method minimizes the performance impact associated with having data backup going on while the system remains on-line. A layer is simply an array of virtual devices and an allocation algorithm. As shown in FIG. 8, partition tables 801, 802 point directly to virtual device tables 821, 822 and have no reference to layers. When data must be demigrated from a storage layer to a computer system or network, it is transferred first into cache 406 and then, when necessary, is migrated to the first storage layer. Demigration must read data, regardless of where it is, so putting layer references in the partition adds overhead. By having the segment table point directly to a virtual device, it bypasses the complicated data management functions and directly accesses virtual devices.

Associated with each layer is an allocation algorithm. The allocation algorithm is used to allocate storage locations when performing migration. Depending on the type of virtual devices and the location of the virtual device in the storage hierarchy, several allocation algorithms are possible. Another consideration in the allocation algorithm is the amount of fragments in the layer. As data is demigrated from a layer, it leaves unused storage locations. These locations must be tracked to know how much physical storage space is actually used. FIGS. 9A–9F illustrate, in conceptual form, a storage layer consisting of three virtual devices 901–903 totaling sixteen data storage locations. In this example are shown three possible layer organizations: sequential circular buffer 911, distributed circular buffer 912 and a pool 913. A sequential circular buffer 911, because of its simplicity and availability of multiple data copies, would be well suited to high read ratio systems that use large duplicate arrays. A distributed circular buffer 912, because it stripes data on more devices, would be ideal in high write ratio environments with minimal duplicate copies. Pooling 913, so long as the virtual devices are not very long access time devices such as tape or libraries, is well suited to the last layer in the storage hierarchy because data migration does not occur from this layer to a subsequent layer so intra layer data sorting does not matter.

The algorithms associated with layering track the number of block based data storage subsystem writes, access sizes and how often accesses had to wait for a virtual device to be free. These statistics indicate the efficiency of the allocation algorithm. If the statistics indicate that the algorithms are not working well or the environment (data access patterns) has changed, the algorithm can be automatically changed, while on line, to an algorithm better suited to the current data access patterns. This result in a short term performance impact while transitioning to the new algorithm but increases performance long term.

Because a layer is an array of virtual devices, it is simple to extend a layer by simply adding a virtual device to the array. Each allocation algorithm also has an insertion algorithm associated with it to provide a method of inserting a virtual device into an array which takes advantage of the allocation algorithm. Additionally, because the block based data storage subsystem storage layers are just an array, it is possible to add entire layers into the hierarchy by adding them to the end of the layer array or inserting a layer between existing layers.

Virtual Devices

A virtual device is viewed by partitions and layers as a linear array of storage locations, just as a partition is viewed by the host computer system 100. A virtual device consists of an array of one or more physical data storage devices and an algorithm to store the data on the data storage devices. Virtual devices implement a data storage technology for increasing performance and/or reliability. This data storage technology includes RAID 1 and RAID 5 data storage subsystems. A RAID 1 architecture normally implies two disk drives, but a virtal device on the block based data storage subsystem 300 can support many duplicate copies of data. For each data storage location on the virtual device there are three bits that indicate the state of the storage location: used/free, backed up/not backed up, cached/not cached. The used/free bit indicates whether the data storage location is presently in use. The backed up bit indicates that, during a backup, the data at the data storage location has been saved to the backup device and may be changed. The cached bit indicates whether some or all of the data from this data storage location is also in cache 406.

The algorithms associated with virtual devices track the number of reads, writes, access sizes and how often an access had to wait for a physical device to be free to get access to the data. These statistics indicate the efficiency of the virtual device. If the statistics indicate that the algorithms are not working, this can be flagged as a performance hindering condition. If the virtual device is a duplicate array (RAID 1), a spare disk drive 317 can be added to or removed from the duplicate array to adjust the performance of the virtual device to match the access patterns of the computer system 100. Because a virtual device views physical devices simply as an array of data storage locations and applies some storage technology (RAID 1, RAID 5 . . . ) to the physical device, different types of physical devices can be used within a virtual device array. For example, an optical and tape jukebox could be mirrored together to form a virtual device providing a more cost effective RAID 1 configuration than two optical jukeboxes.

Spare Resource Lists

A list is kept of spare data storage resources. These spare resources are intended to increase reliability in the event of an component failure (hot spare drive) but when not needed, they may be used to increase the functionality of the block based data storage subsystem. The spare resource list is an array of pointers. Each pointer references a structures which indicates the type of resource, its characteristics (size, location . . . ) and its current use. When a condition is detected or an event occurs which needs a resource, the spare resource list is checked to see if a resource is available. This can be used in many ways but the primary uses are for load balancing a duplicate array by adding another drive to the duplicate array and by providing a high performance copy of incremental backup data and data that has changed since the last backup. Conceptually this could be extended to power supplies, fans and other redundant components.

Segment Information

As part of each data storage location managed by the block based data storage subsystem, additional information is stored to be used to recover in the event of a catastrophic error. The information includes:

Segment Signature—Specific data pattern which indicates that the data is segment data Partition #—Identifies the partition from which this data was obtained Segment #—Identifies the segment in the partitions segment table Layer #—Identifies the layer this data is stored on in the storage hierarchy Virtual Device #—Identifies the virtual device, and possibly a sub device (RAID 5)

Version #—The version number of this segment. This is the date and time this segment was written.

This segment information allows, in the event of a catastrophic error, the system to rebuild all possible system data structures and data.

Logical Mapping

On most data storage devices, such as magnetic disk drives, a given block of data maps directly to a known data storage location. For example, block 0 is mapped at cylinder 0, track 0, sector 0. The problem is that operating systems commonly access data without regard to the physical layout of the data on the data storage medium, thereby significantly decreasing I/O performance. Rather than store data at fixed physical locations, the block based data storage subsystem 300 store blocks of data according to the input stream of the data. This is under the assumption that the way data is written into the block based data storage subsystem 300 is likely the way it is read/written from/to the system in the future. Where computer systems may lack in efficiency of storing data, they make up in predictability. In the block based data storage subsystem system 300, when a block of data is written to the system, it is assigned to the next available data storage location within first storage tier in the block based data storage subsystem 300. A table entry is made to indicate the location of the block so that when it is accessed, its location can be quickly determined. This process of remapping the data to a different location occurs transparently to the host computer system.

Figure 10:
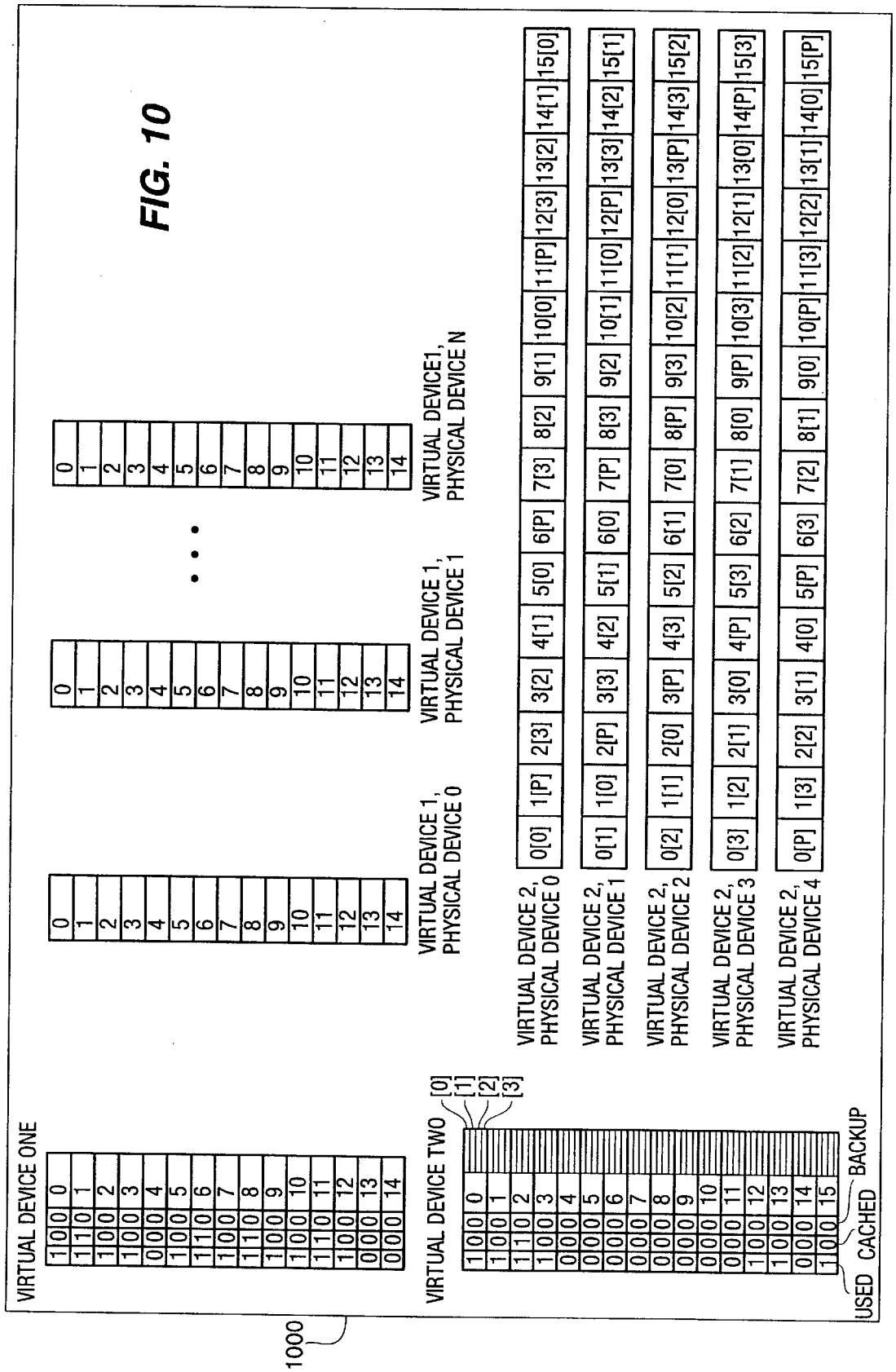
FIG. 10 illustrates a diagram of the RAID configurations capable of being implemented in the block based data storage subsystem.

FIG. 10 conceptually illustrates the mapping of data. Depending on the type of storage technology being used to store the data and the tier to which the data is to be stored and retrieved, an algorithm is defined which maximizes the effectiveness of the storage technology. For example, if the data is stored in a tier containing a single disk drive, the data is written sequentially on to the data storage media, starting at the last used data storage location, since this provides the best possible performance. If writing to a disk drive array, it is preferable to store the data to a data storage device other than the last used data storage device so that when the data is read again, if the last block of data and the current block of data are both accessed, two physical devices can retrieve the data, doubling the read performance of the data storage subsystem. Finally, if the data is stored to RAM, which requires no physical access, the data is stored to the most convenient location for the software to manage.

The block based data storage subsystem 300 is made up of tiers, each which consists of one or more data storage device technologies (as shown in FIG. 4). For each tier, an algorithm is specified which determines where the data is to be written. For each data storage device within a tier, an algorithm is defined on how to read/write the particular data storage device. It is important to note that a data storage device could be a single disk drive, a robotic magnetic tape cartridge storage library, a disk drive array, or other data storage technology used for data storage, including another block based data storage subsystem. This differentiation allows tiers to be made of differing data storage devices and performance optimized for the data storage needs of the specific tier. Using a specific algorithm for each data storage device allows the performance characteristics to be optimize for a specific data storage device type and allows similar device types to be used in different tiers.

This mapping scheme allows the block based data storage subsystem software to easily monitor how close to the physical capacity a given tier is by tracking the number of available blocks and the number of blocks used. As a tier fills up and reaches a threshold, the control software of the block based data storage subsystem starts a migration process to move data from one tier to the next tier in the system. This gives the basis for the hierarchical storage management part of the block based data storage subsystem. Because the block based data storage subsystem incorporates its own CPU and does not need to be concerned with using up bandwidth of the host computer, the block based data storage subsystem starts migrating data when time is available or when a low watermark is hit and does not force migration until a high watermark is hit. This is a predictive method of performing migration which utilizes idle time to perform necessary hierarchical storage management functions versus reactive methods existing in current implementations which are performed when performance is most needed.

Data Write Algorithm

The data write algorithm is run when the computer system 100 requests the block based data storage subsystem 300 to write data blocks to a partition. The block based data storage subsystem 300 simply allocates cache memory to receive the data blocks transmitted by the computer system 100, transfers the received data blocks to cache 406 when they are received and returns a write complete status to the transmitting computer system 100. The caching algorithms age the data, depending on the LRU algorithms of the cache 406, to determine when the data is to be moved from cache 406 to the first storage layer.

Figure 11:
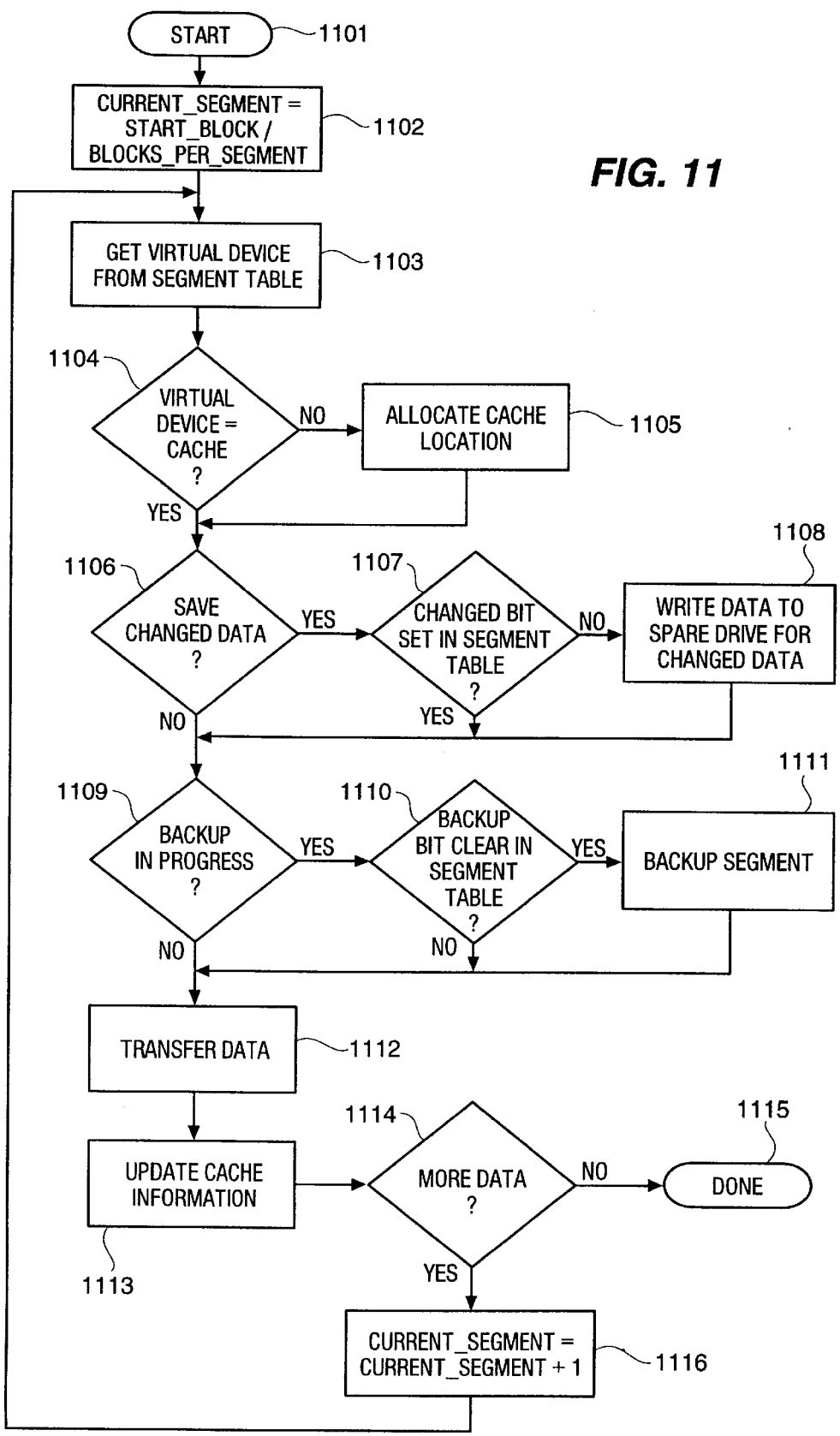
FIG. 11 illustrates in flow diagram form the operation of a data write function in the block based data storage subsystem.

The flow chart of FIG. 11 illustrates the operational steps taken by the block based data storage subsystem 300 to perform the data write operation. At step 1101, the process is initiated by the CPU of the data storage subsystem in response to receipt of a data write command. At step 1102, the CPU sets the current segment indicator to equal the identity of the starting block identified by the computer system in this transmission. At step 1103, the CPU retrieves the identity of a virtual device from the segment table, to identify where the received data blocks are to be stored. The CPU at step 1104 checks to determine whether the virtual device is the cache 406, and if not allocates space in the cache 406 at step 1105 to store the data blocks transmitted by the computer system. Upon completion of the cache space allocation, or if the virtual device was initially selected to be the cache 406, the received data block is written into cache 406 and the CPU at step 1106 determines whether the data block is to be written to backend storage. If the data block is to be stored, at step 1107 the CPU determines whether the changed bit in the segment table entry associated with this allocated space is presently set. If not, the data block is written to a spare drive which is used to store changed data. Upon completion of the data block write or if the changed bit is already set or if the changed data is not to be saved, processing advances to step 1109 where the CPU determines whether there is a presently active data backup in progress. If so, processing branches to steps 1110 and 1111 where the CPU determines whether the backup bit for this segment is set and if so backs up this segment. Upon completion of the backup or if the backup bit was not set or the backup process was not active, the CPU at step 1112 proceeds to transfer the data block from the host to cache memory 406. The cache memory status information is updated at step 1113 and a determination is made at step 1114 whether additional data blocks are to be received from the computer system. If not, processing exits at step 1115. If additional data is available, the CPU increments the segment identifier at step 1116 and returns to step 1103 to process the next received data block.

Data Read Algorithm

The data read algorithm is called whenever the computer system requests the data storage subsystem 300 to read data. Requests for data that has never been written returns zeroes. Valid data is returned from either cache 406 or is denigrated for the virtual device where it is stored, placed into cache 406 and then transferred to the computer system.

Figure 12:
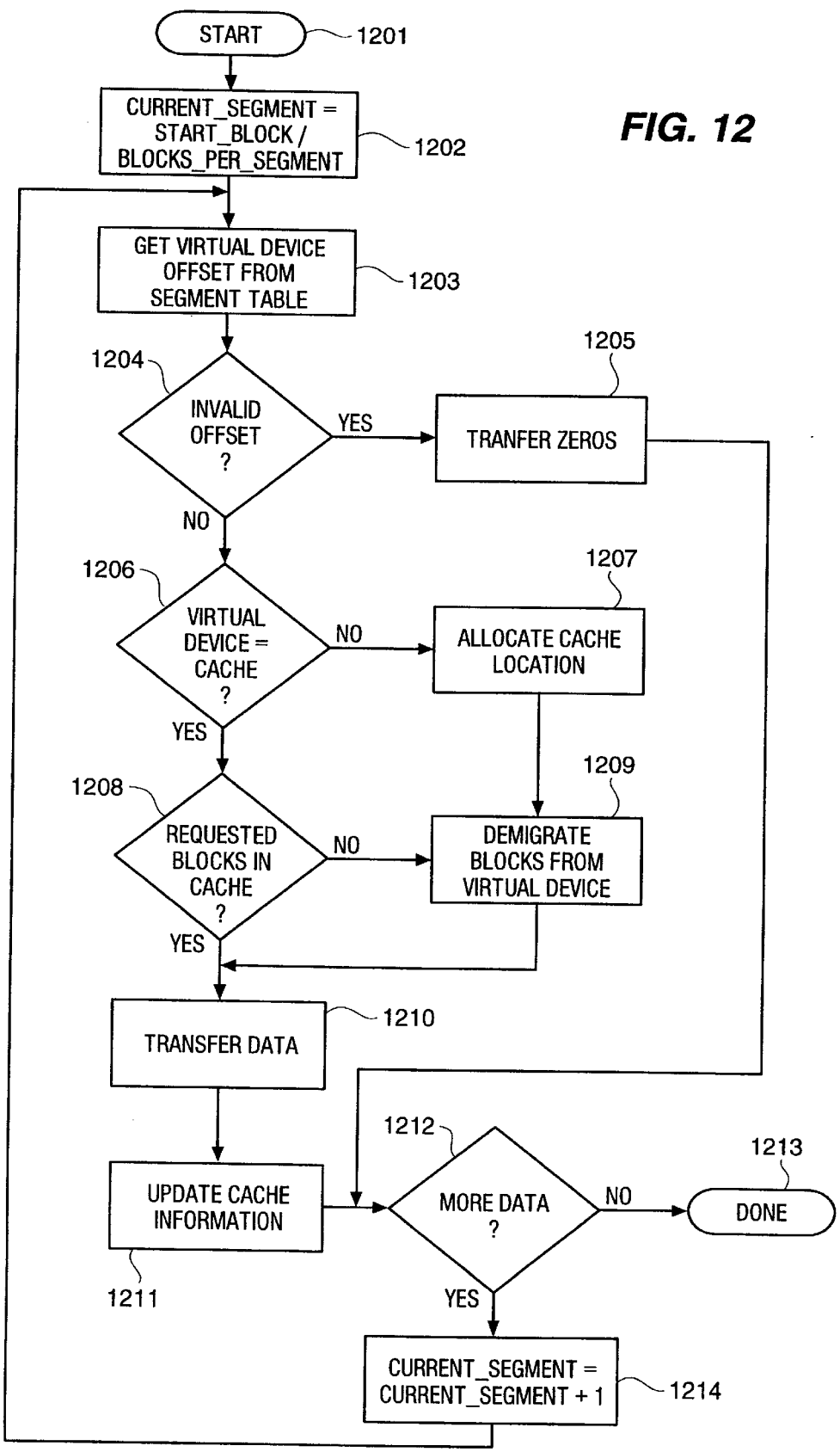
FIG. 12 illustrates in flow diagram form the operation of a data read function in the block based data storage subsystem.
Figure 13:
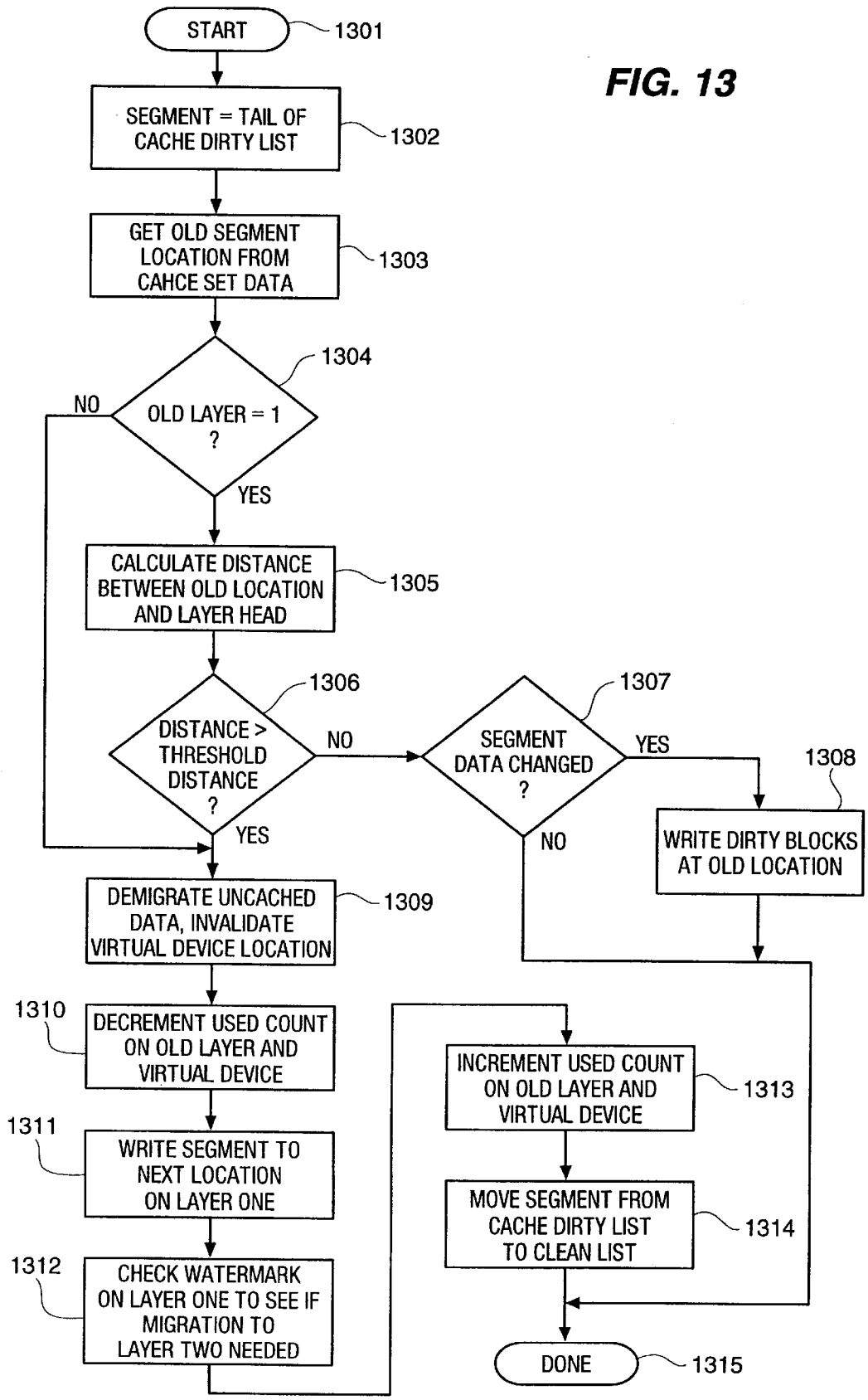
FIG. 13 illustrates in flow diagram form the operation of a cache to layer one data migration function in the block based data storage subsystem.

The flow chart of FIG. 12 illustrates the operational steps taken by the block based data storage subsystem to perform the data read operation. At step 1201, the process is initiated by the CPU of the data storage subsystem in response to receipt of a data read command. At step 1202, the CPU sets the current segment indicator to equal the identity of the starting block identified by the computer system in this transmission. At step 1203, the CPU retrieves the virtual device offset from the segment table, to identify where the retrieved data blocks are to be read. The CPU at step 1204 checks to determine whether the virtual device offset is valid and if not at step 1205 transmits zeroes to the computer system as an indication of an invalid offset. If the virtual device was not initially selected to be the cache 406, as determined at step 1206 the CPU allocates space in the cache 406. If the virtual device was initially selected as cache 406, the CPU at step 1208 determines whether the data block is written on backend storage. If the data block is stored on a backend device, at step 1209 the CPU demigrates the identified data block to cache 406. Upon completion of the demigration of or if the cache 406 was not initially identified, the CPU at step 1210 proceeds to transfer the retrieved data block from cache memory 406 to the requesting computer system. The cache memory status information is updated at step 1211 and a determination is made at step 1212 whether additional data blocks are to be received from the computer system. If not, processing exits at step 1213. If additional data is available, the CPU increments the segment identifier at step 1214 and returns to step 1203 to process the next retrieved data block.

Cache to Layer One Migration

The block based data storage subsystem 300 runs this algorithm as a background task whenever the number of used cache locations exceeds a preset threshold. The cache 406 is managed using two lists, a clean list and a dirty list. The clean list contains cache locations that have been synchronized with non volatile memory and may be immediately used when the routine is called to allocate cache locations. The dirty list contains cache locations that must be migrated to non volatile storage. After a location is migrated to non volatile storage, it is moved to the clean list. In some cases, the cache location only contains a portion of the data that is to be written. If that is the case, the remaining data is demigrated from its present location before being written. This prevents partial segments from existing in more than one place.

The cache migration process is initiated at step 1301 and the CPU sets the present segment number to the tail entry of the cache dirty list at step 1302. At step 1303, the CPU retrieves the old segment location from the cache set data and sets the old layer identification to 1 at step 1304. When data block migration is occurring, there is a check at steps 1305 and 1306 to see if the old location of the data contained in the cache location was on the first storage layer and close to where the next free location is on the first layer. If that is the case, at step 1308 any changed data (as determined at step 1307) is written to the old location. If the data is unchanged from the data on the first storage layer (known by the changed bit in the partition table), no write is needed. This prevents fragmentation of the first storage layer, the most likely place for fragmentation.

If the data cannot be written at its old location as determined at step 1306, it is written to the next available location as provided by the layers allocation algorithm of steps 1309–1314. In particular, at step 1309, the CPU demigrates uncached data and invalidates the present virtual device location. When migrating data from cache 406 to layer one, and part of the data must be denigrated from its old virtual device location, once the data is retrieved from the old location, its old location is invalid because the segment is written at the new location on layer one. At step 1310, the CPU decrements the used count for both the old layer and the selected virtual device. This enables the CPU to write the identified segment from cache memory at step 1311 to the next available data storage location in layer one. Once this operation is completed, the CPU checks the watermark threshold for layer one at step 1312 to determine whether migration to layer two is advisable due to over utilization of the data storage capacity of layer one. If additional migrations are required to free data storage space on layer one the interlayer process of FIG. 14 described below is enabled. In any case, at step 1313, the CPU increments the used count for both the layer and the virtual device and moves the segment identifier for this segment from the dirty list to the clean list at step 1314. Processing then exits at step 1315.

Inter Layer Migration and Intra Layer Defragmentation

The block based data storage subsystem 300 runs this algorithm as a background task whenever the low watermark for available segments is hit on one of the data storage layers and idle time exists. As a task, its priority increases as the distance between the head and tail pointers of the layer (if viewed as a circular buffer) approaches zero.

Fragmentation occurs whenever data is demigrated to cache 406 and then not migrated back to the same data storage location in the originating layer. This leaves the old location unused and leaves a gap in the sequence of segments. Certain layer allocation schemes (least recently used) can prevent fragmentation, but the use of these allocation schemes is limited due to excessive memory requirements. Two methods exist for freeing data storage space on a given layer: migrating data from the present layer to the next layer or recovering unused segments from this layer. It is a fair assumption that the present storage layer is a higher performance layer than the next storage layer. For that reason, it is faster to defragment than to perform data block migration and both methods are used to free more data storage locations in the layer. The number of used segments is tracked and the distance between the tail pointer is also readily calculated. In a layer with no fragments, the number of used segments and the distance between the head and the tail pointers add up to the total number of segments on the layer. The difference between the used and the head and tail calculation identify the number of fragments in this layer. If the number of fragments exceed a certain percentage, a defragmentation operation is in order.

Defragmentation only makes sense on random access devices as it would be too lengthy on sequential (tape) access devices.

Figure 14:
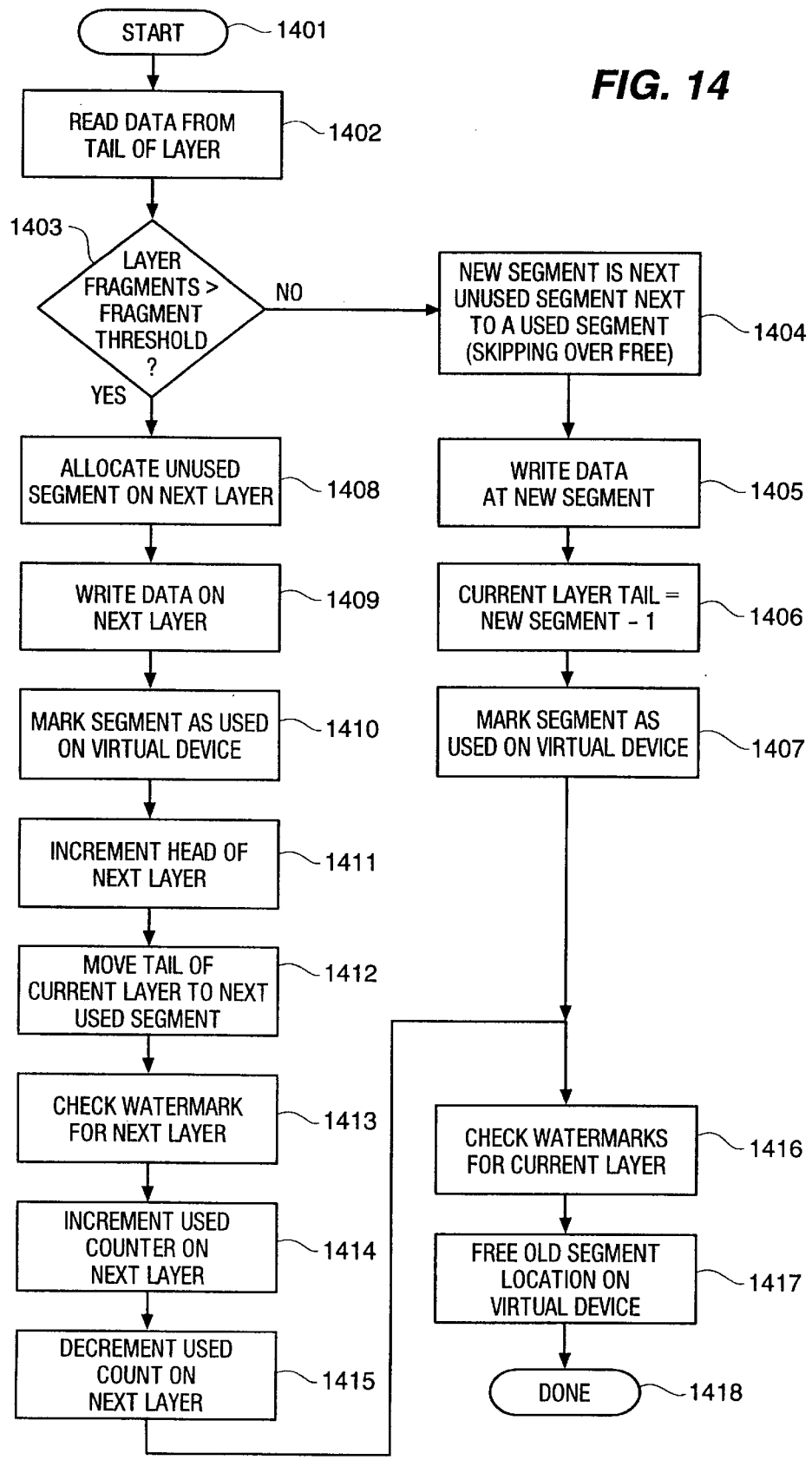
FIG. 14 illustrates in flow diagram form the operation of a data migration and defragmentation function in the block based data storage subsystem.

The process for migration and defragmentation is illustrated in flow diagram form in FIG. 14. The process is initiated at step 1401 and the CPU proceeds to read data from the head pointer and tail pointer of the selected layer at step 1402. The CPU at step 1403 determines whether the number of fragments is in excess of a predetermined threshold, as described above. If not, processing advances to steps 1404–1407 where the data block write operation in a defragmentation mode is summarized. In particular, at step 1404 the next segment for use is selected to be the first unused segment that is next to a used segment in the span of used segments. This operation functions to backfill the unused segments and thus eliminate the fragmentation. The data is written into this free segment at step 1405 and the CPU resets the tail pointer for this layer at step 1406 and marks the last written segment as used in the virtual device table at step 1407. Processing then advances to step 1416 as is described below.

If, at step 1403, the layer is not excessively fragmented, the CPU at step 1408 allocates an unused segment on the next successive layer of the hierarchy for data block migration. The CPU writes a selected data block at step 1409 from the present layer to the allocated unused segment on the next successive layer and marks this segment at step 1410 as used in this virtual device. At step 1411, the CPU increments the head pointer of the next successive layer to indicate the addition of a data block to this layer and also resets the tail pointer of the present layer to the next used segment at step 1412. The CPU at step 1413 checks the watermark of the next successive layer to determine whether the just completed data block write operation has exceeded the segment use threshold for that layer and if so schedules a migration/defragmentation operation for that layer. In either case, at steps 1414 and 1415 the CPU increments the used segment counter for the next successive layer and decrements the used segment counter for the present layer to reflect the just completed data block migration operation. At step 1416, the CPU checks the watermarks for the present layer to determine whether additional data block migration is necessary and also at step 1417 lists the old segment location in the present layer as now free. The process exits at step 1418.

Incremental Backup and Full Backup

The block based data storage subsystem 300 performs data backup as a scheduled event. The timer interrupts, which occur approximately every 50 milliseconds, check for scheduled events and if an event is to execute, it is placed in the task queue. A queue is used so that computer system data write operations can have segments backed up before allowing them to be written (as illustrated in the discussion of FIG. 11 above). Backing up segments before allowing them to be changed functionally freezes the system at a point in time.

There are four types of backups:
1. Full System Backup
2. Full Partition Backup
3. Incremental System Backup
4. Incremental Partition Backup For a full backup process, this process backs up every valid segment in the data storage subsystem. If the backup process is an incremental backup, then only the changed blocks, not previously backed up are processed. A partition based backup uses the segment table backup bits to identify the segments in the particular partition to be backed up. The system based backup uses the virtual device table backup bits to identify segments for backup.

System backups use the virtual device backup and changed bits. The firmware scans each layer, starting at the layer head and working backward through each virtual device until all data in the block based data storage subsystem 300 has been backed up. For incremental backup, only the changed segments are backed up. Partition backups go through the partition table and search for changed blocks for each layer/virtual device starting with layer 0 and the virtual device at the head of the layer. If incremental sparing is enabled, for each segment that is written to the backup device, it is also be written to the incremental spare(s).

Figure 15:
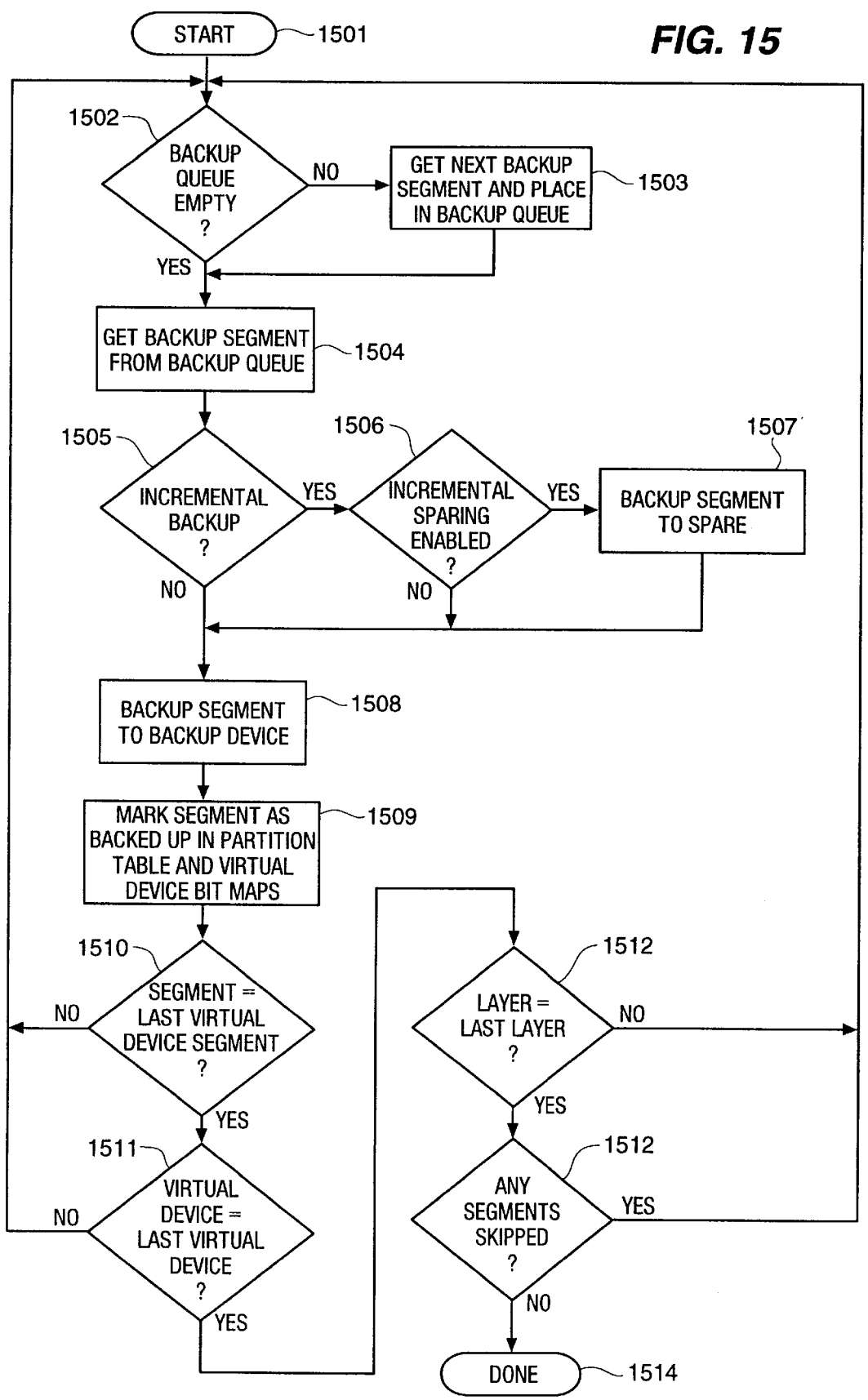
FIG. 15 illustrates in flow diagram form the operation of a data backup function in the block based data storage subsystem.
Figure 16:
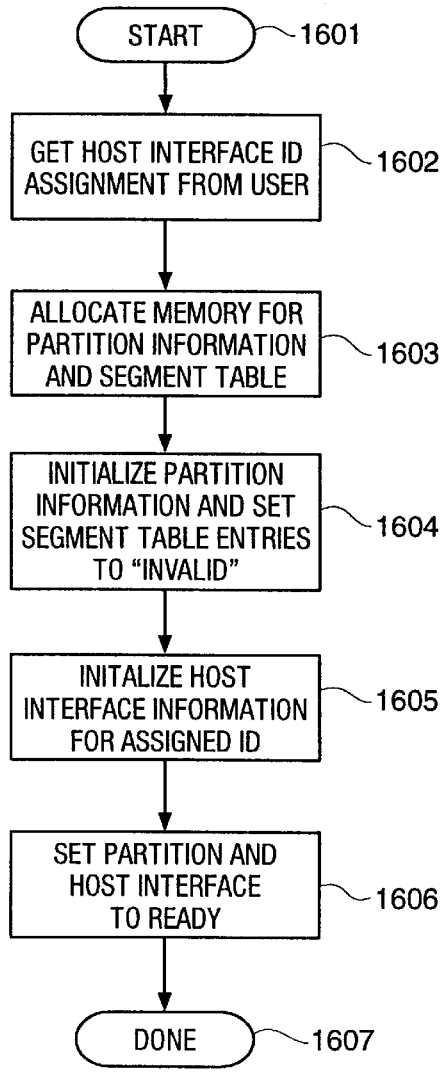
FIG. 16 illustrates in flow diagram form the operation of a create new disk function in the block based data storage subsystem.

The flow chart of FIG. 15 illustrates the operation of the data backup process. This process is initiated at step 1501 and the CPU at step 1501 scans the backup segment identification queue to determine whether the queue is empty. If there are entries in the backup segment identification queue, processing advances to step 1503 where the CPU retrieves the next identified segment to be backed up and places the identified segment in the backup queue. Processing then advances to step 1504 where the CPU retrieves a backup segment from the backup queue. If the backup is an incremental backup process, at step 1505 processing branches to steps 1506, 1507 where the backup segment is written to a spare data storage device if incremental sparing is provided. Upon completion of this write, or if incremental sparing is not provided or there is no incremental backup, processing proceeds to step 1508 where the CPU backs up the retrieved segment to the backup data storage device. At step 1509, the CPU marks the segment as backed up by resetting the backup bits in the partition table and virtual device table associated with the segment that was backed up. At step 1510, the CPU determines whether this segment was the last virtual device segment. If not, processing returns to step 1502 and steps 1502–1510 are repeated until all segments on the virtual device have been backed up. At this juncture, the CPU advances to step 1511 where the CPU determines whether this virtual device was the last virtual device. If not, processing returns to step 1502 and steps 1502–1511 are repeated until all segments on the virtual devices in this layer have been backed up. At this juncture, the CPU advances to step 1512 where the CPU determines whether this layer was the last layer. If not, processing returns to step 1502 and steps 1502–1512 are repeated until all segments on the virtual devices in all the layers have been backed up. Processing then advances to step 1513 to determine whether any segments were skipped in the above-described process. If so, processing returns to step 1502 to backup the skipped segments. Once all segments have been backed up, the process exits at step 1514.

Creating a New Disk

This is the process of creating a new logical disk drive. This process does not directly use any physical data storage and does not have any real effect until data is written the created logical disk drive. The process is initiated at step 1601 and at step 1602, the user has the option of selecting a host ID to which this partition is attached. It is important to note that partitions can be attached to multiple host ID's to allow more than one system to access the disk without having to compete on a given host interface bus or specific host interface ID. The CPU at step 1603 allocates memory for the partition information and segment table and at step 1604 initializes the partition information and sets all the segment entries in this newly created partition table to invalid. The CPU at step 1605 initializes the host interface information for the assigned host ID and then sets the partition and host interface to a ready status at step 1606, exiting the process at step 1607.

Creating a Restore Disk

Figure 17:
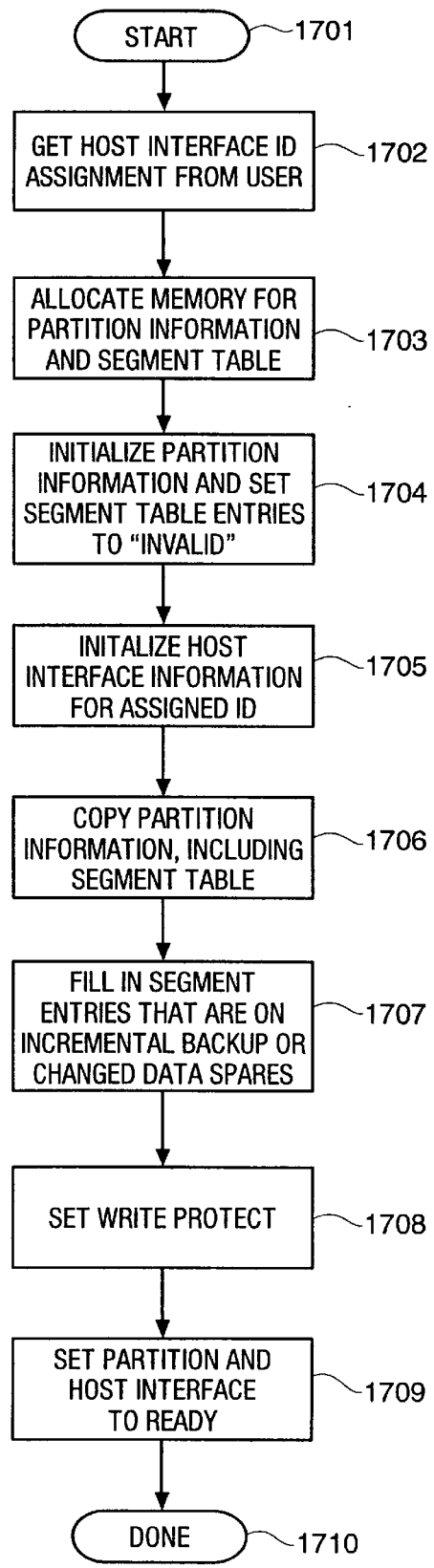
FIG. 17 illustrates in flow diagram form the operation of a create a restore disk function in the block based data storage subsystem.
Figure 19:
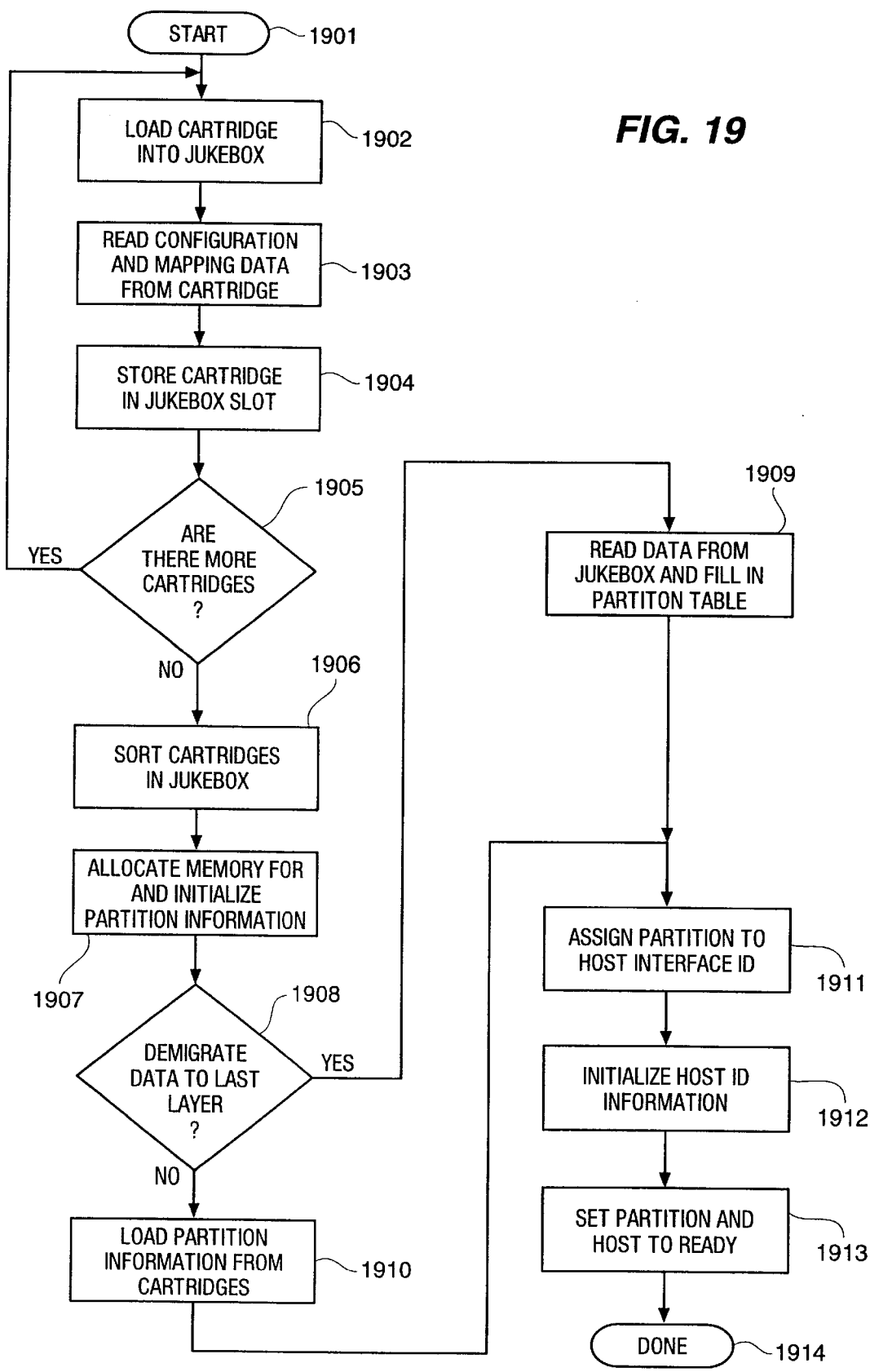
FIG. 19 illustrates in flow diagram form the operation of a data partition import function in the block based data storage subsystem.

If the block based data storage subsystem 300 uses a restore disk, which is a host accessible copy of the partition as it existed at a previous point in time, the process of FIG. 17 is executed, starting at step 1701. The process at step 1702 enables the CPU to obtain a host interface ID from the user to which this partition is attached. It is important to note that partitions can be attached to multiple host ID's to allow more than one system to access the disk without having to compete on a given host interface bus or specific host interface ID. The CPU at step 1703 allocates memory for the partition table and virtual device table and at step 1704 initializes the partition information and sets all the segment entries in this newly created partition table to invalid. The CPU at step 1705 initializes the host interface information for the assigned host ID. A present copy of the partition mapping table is copied at step 1706 to the restore partition table and then the CPU at step 1707 notes the location of the changed segments in this partition table. Once created, the restore disk appears as a standard disk drive. Restore disks are set to write protect status at step 1708 to prevent accidental writes. The CPU then sets the partition and host interface status to ready and exits at step 1710. Restore disks are ideally suited for data storage systems that use incremental and changed data sparing. Incremental sparing has a copy of the incremental backup data on a high speed data storage device allowing high speed restores. Changed data sparing, like incremental sparing also copies data to a high speed data storage device but it is the data, before it was changed, that has been written since the last incremental backup. This method provides what looks and acts like a high speed data storage device but with "frozen" images of what the data storage system looked like in the past. This allows recovery from accidental file deletion or in the event of a network crash (not ADS but entire computer/network), this data could be made the on-line copy and the system could be restarted from a previous point in time.

Exporting a Partition

The block based data storage subsystem 300 supports the export of entire partitions from the system, as illustrated in flow diagram form in FIG. 18. This process is initiated at step 1801, the CPU write protects the selected partition at step 1802 and the CPU makes a full backup of a partition at step 1803 onto a removable media device. At step 1804, the CPU disassociates the selected partition from the host interface ID and then ejects the media from the removable media device at step 1805. The link between the host interface and the partition is broken and the partition data structures are deallocated at step 1806 and the process exits at step 1807. The partition could then be stored or moved to another block based data storage subsystem which had a compatible removable media device. At a later time, the partition could then be imported and the partition restored.

Importing a Partition

Importing a partition into the block based data storage subsystem 300 is similar to creating a new disk except that data already exists for the partition. The process is initiated at step 1901 and consists of loading the cartridge(s) at step 1902 into the removable media device(s). At step 1903 the CPU reads the configuration and mapping data from the retrieved media cartridge and stores the cartridge at step in 1904 in a selected jukebox slot. The CPU then determines at step 1905 whether there are more cartridges that need to be retrieved. If so, processing returns to step 1902 and steps 1902–1905 are repeated until all selected removable cartridges are loaded in the jukebox. CPU at step 1906, if necessary, sorts the cartridges (jukebox) and allocates at step 1907 memory for the partition and initializes the partition information. At step 1908, the CPU determines whether the data is to be demigrated to the last layer of the hierarchy. If so, at step 1909, the CPU reads the data from the removable cartridges stored in the jukebox and fills in the entries in the partition table. If the data is not to be demigrated to the last layer, then step 1910 is executed and the partition information is loaded into the partition table from the removable cartridges. At step 1911, the CPU assigns a host interface ID to the partition and initializes the host computer system ID information at step 1912. The CPU resets the status of the partition and host interface to ready at step 1913 and exits at step 1914. In this process, the data could optionally be migrated from the import copies to the available storage locations on the last storage layers in the block based data storage subsystem. The cartridges could then be exported from the system or the cartridges reused. Importing and exporting allows portability of data between system or allows partitions to be archived.

Adding Capacity to System

Capacity can be added to the block based data storage subsystem at any time and without taking the system offline. The example of FIG. 20 describes how a virtual device is added to a layer. Entire layers may be added as well. While the virtual device is being added, the layer must be locked to prevent destructive access by other tasks. Since this process is strictly computational, this should take less than a millisecond or two. The insertion point of the virtual device depends on the layers allocation algorithm. Ideally, the virtual device is added at or close to the head (circular buffer perspective) of the layer. This allows the space to be immediately used. If not added at this point, the new virtual device is a large fragment until the layer's head pointer reaches the start of the virtual device. Layers point to virtual devices through an array of pointers to virtual device information. This allows virtual devices to be added to layers by simply moving the pointer references. Once added to the pointer array, the layer is extended by simply adding the number of blocks in the virtual device to the number of blocks in the layer.

The process begins at step 2001 and the CPU at step 2002 locks the layer to prevent access to any data storage devices located in that layer while the layer extension process is executing. At step 2003, the CPU determines where to place the new virtual device in the architecture of this layer, which determination is made pursuant to the layer allocation algorithm. Once the insertion point for this extension is determined, the CPU at step 2004 adjusts the virtual device pointer array to make room for the virtual device pointers associated with the newly added virtual device, which pointers are added at step 2005. The CPU at step 2006 increases the number of blocks of available memory by incrementing the present number by the size of the newly added virtual device. The CPU finally unlocks the layer at step 2007 and exits the process at step 2009.

Recommendation of Capacity Expansion

The firmware, by evaluating the statistics tracked in the data storage hierarchy as noted above, can make an educated guess, based on historical data, of how to best expand the capacity of the block based data storage subsystem. The primary information needed by the system to calculate expansion requirements is the importance of cost versus performance of the block based data storage subsystem. If performance is paramount, space is more likely to be recommended for addition at the top (faster, more expensive) of the hierarchy. If cost is most important, space is more likely to be recommended for additional at the lower portion of the hierarchy. Cache statistics and spare device usage statistics are also evaluated to determine how these areas would be best expanded. Expansion recommendations are relative to the current capacity distribution.

Figure 21A:
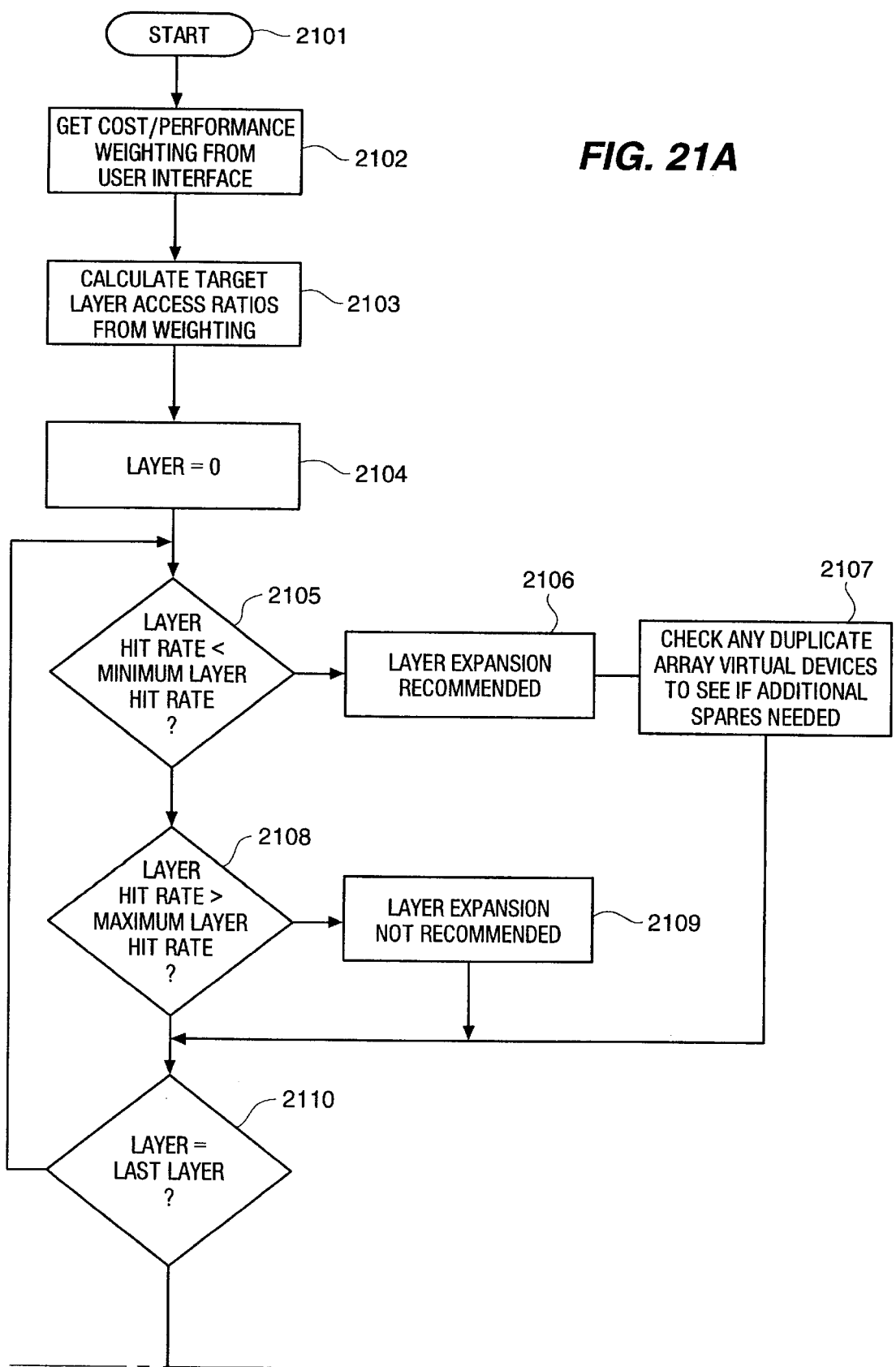
FIGS. 21A and 21B illustrate in flow diagram form the operation of a capacity expansion recommendation function in the block based data storage subsystem.
Figure 21B:
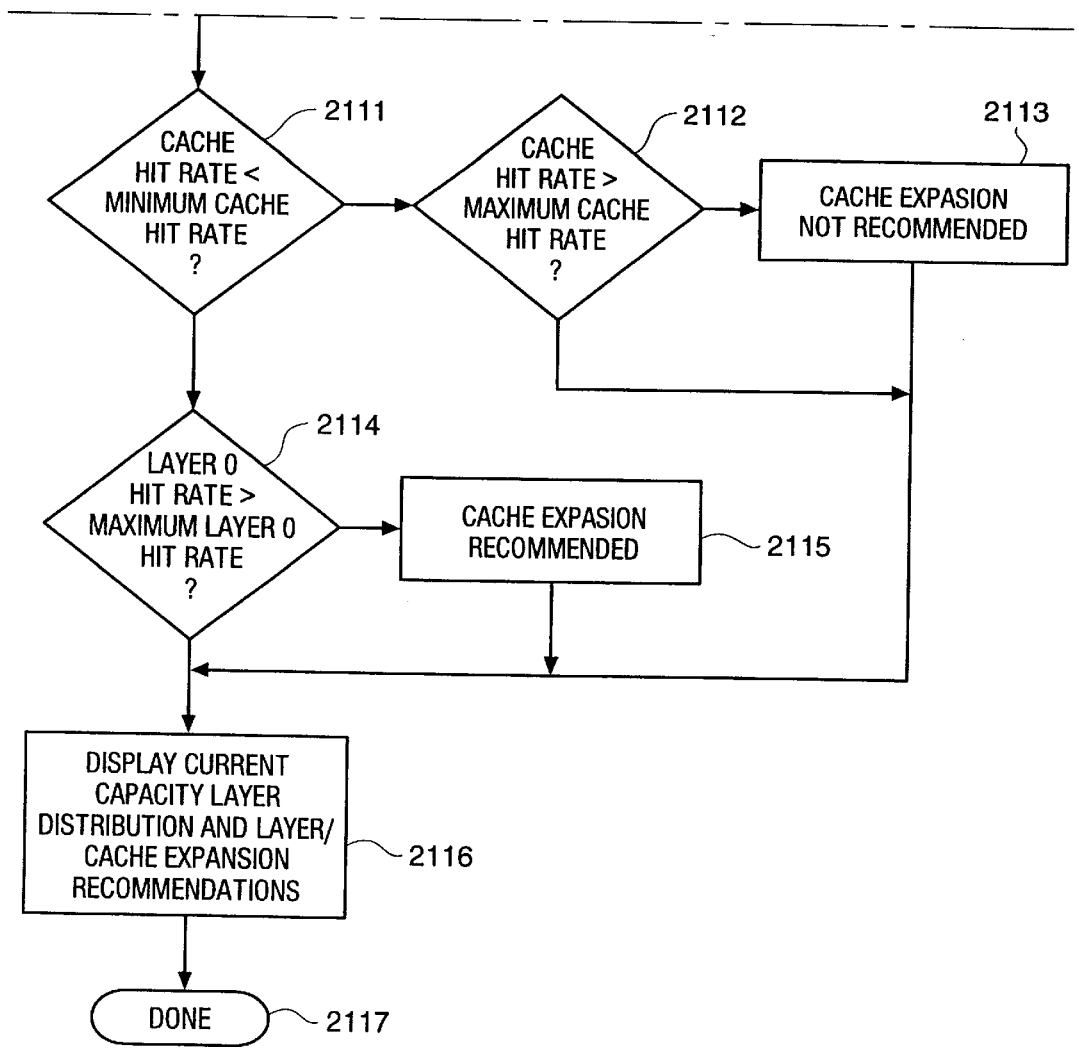

The capacity expansion recommendation process is disclosed in flow diagram form in FIGS. 21A, 21B, which process begins at step 2101. The CPU at step 2102 obtains data from the user indicative of the cost/performance weighting information which is to be used in the computation process. At step 2103, the CPU calculates the target layer access ratios from the weighting data obtained at step 2012. The CPU at step 2104 sets the layer number to 0 and at step 2105 determines from the stored statistical data whether the layer hit rate is less than the minimum desired layer hit rate. If so, then at step 2106 the CPU recommends expansion of this selected layer and at step 2107 checks the duplicate array virtual devices to determine whether additional spares are needed. If, at step 2105, a negative determination is returned, processing advances to step 2108 where the CPU determines whether the layer hit rate is greater than the maximum desired layer hit rate. If so, then at step 2109 the CPU recommends not to expand this selected layer. The CPU at step 2110 determines whether the presently selected layer is the last layer. If not, processing returns to step 2105 and steps 2105–2110 are repeated until all layers have been analyzed. Processing then advances to step 2111 where the CPU in steps 2111–2115 performs steps analogous to steps 2105–2109 for the cache memory 406 to determine whether the cache 406 needs to be expanded. At step 2116, the CPU has determined the present capacity on a layer basis and has created the set of recommendations for the user, which information is displayed to the user and the process exits at step 2117.

Dynamic Load Balancing

Figure 22:
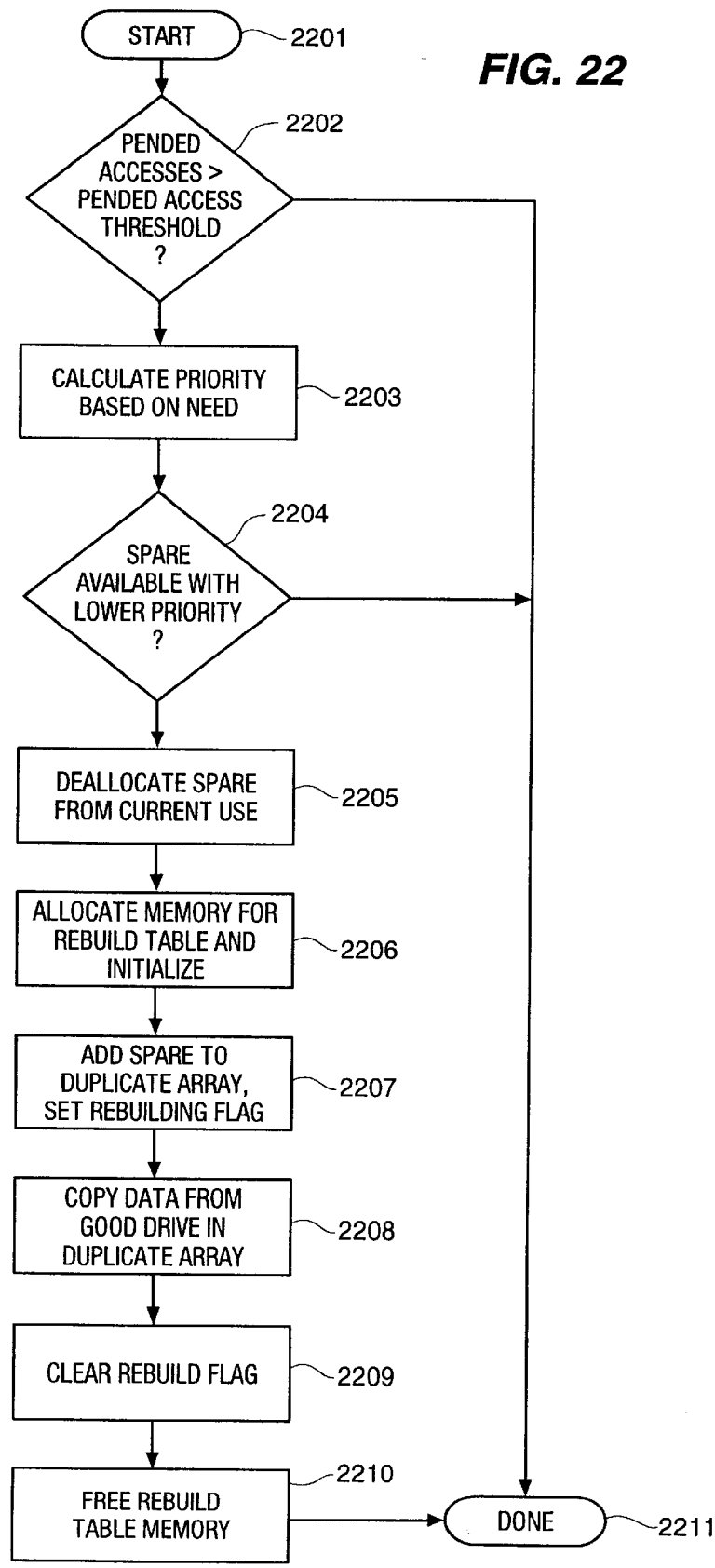
FIG. 22 illustrates in flow diagram form the operation of a load balancing function in the block based data storage subsystem.

Load balancing can be accomplished by determining which virtual devices are being overtaxed and adding resources to the block based data storage subsystem to ease the stress to these devices. The algorithm illustrated in flow diagram form in FIG. 22 describes load balancing process for duplicate arrays. The process begins at step 2201 and the CPU at step 2202 determines, for each virtual device, the number of accesses that had to be delayed because the data storage devices containing the data were busy. If this calculated number indicates adequate performance, processing exits at step 2211. If not, at step 2203 the CPU calculates a priority of balancing the performance based on need. If the priority is high and exceeds a threshold, the priority of the virtual devices currently using spares is determined and if one is found with a lower priority at step 2204, the spare is taken from that virtual device at step 2205 and allocated to the high priority virtual device at step 2206. Once allocated, the data on the virtual device needs to be synchronized with the new device. While this is occurring accesses to the new device are limited to those data segments that have been synchronized. The synchronization process entails adding the spare device to the duplicate array at step 2207 and setting the array rebuilding flag. At step 2208, the CPU copies the data from the good drive in the duplicate array to the spare drive and at step 2209 clears the rebuild flag. At step 2210 the CPU frees the rebuild table memory and the process exits at step 2211.

Disaster Recovery from a Failed Virtual Device

While unlikely, it is possible for multiple simultaneous device failures to occur in the block based data storage subsystem, resulting in lost data or for no redundancy to exist on levels in the storage hierarchy. When such a failure occurs, the firmware attempts to recover whatever segments can be recovered and identifies any unrecoverable segments. When complete, a routine is called to interface to the user to determine how to deal with unrecoverable blocks. Options include ignoring the unrecoverable data, recovering part of the data from good devices (whatever drives are still working in a RAID 5 array) or returning an error whenever the unrecoverable blocks are accessed until the blocks are written.

Figure 23:
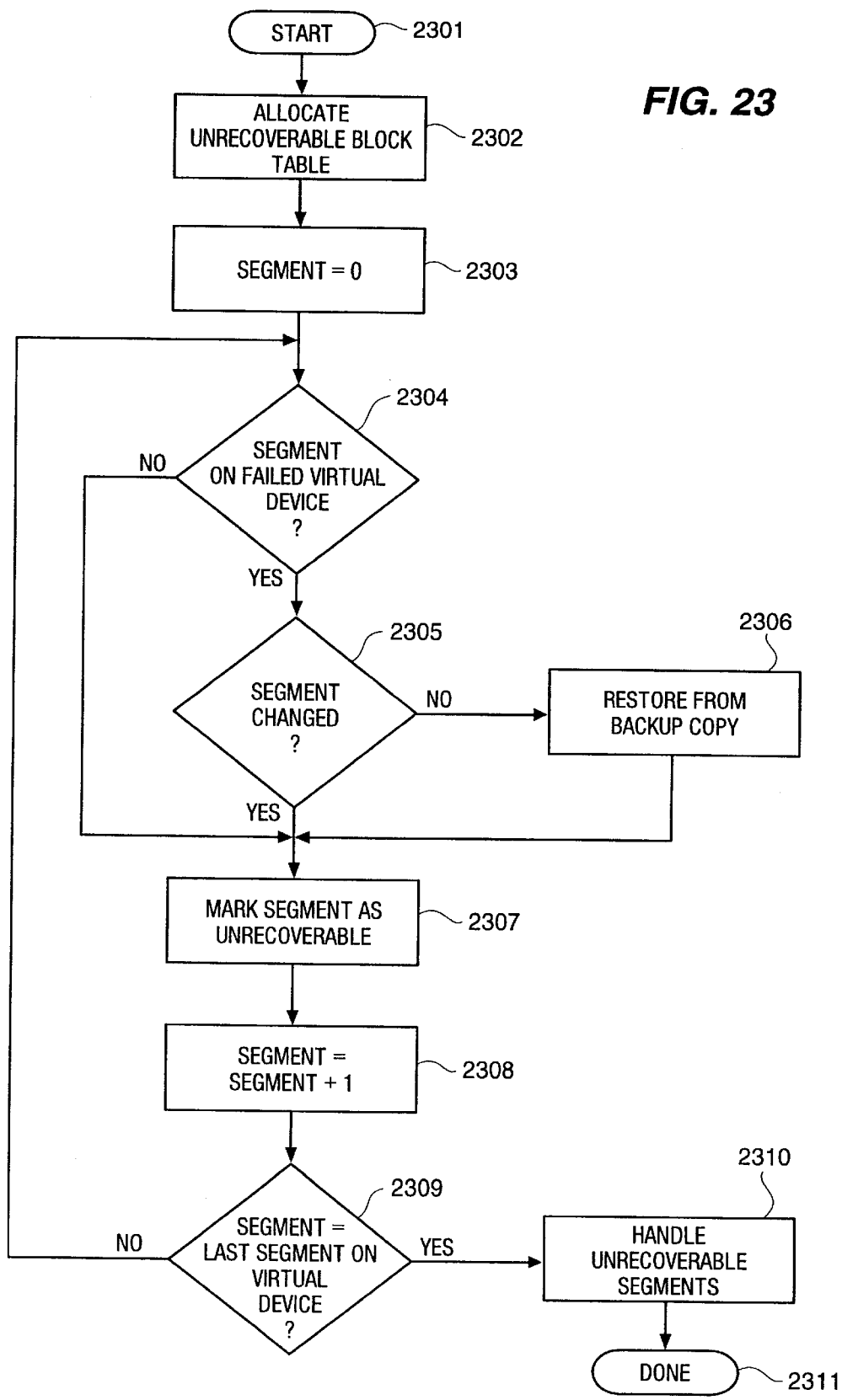
FIG. 23 illustrates in flow diagram form the operation of a virtual device failure recovery function in the block based data storage subsystem.

The failure recovery process is disclosed in flow diagram form in FIG. 23, wherein the process starts at step 2301. The CPU at step 2302 allocates an unrecoverable block table and sets the segment number to 0 at step 2303. At step 2304, the CPU determines whether this segment is a segment on a failed virtual device. If it is, at step 2305 the CPU determines whether the segment has not changed and if so restores the segment from backup memory at step 2306. If the segment is not from a failed virtual device or has changed or has been restored, at step 2307 the CPU marks this segment as unrecoverable and increments the selected segment number at step 2308. At step 2309, the CPU determines whether the selected segment is the last segment on the virtual device and if not returns to step 2304 so that steps 2304–2309 are repeated for all segments. At step 2310, the CPU handles the unrecoverable segments as described above and the process exits at step 2311.

Disaster Recovery From a System Wide Failure

If configuration and state information is lost, data that is embedded on the storage devices can be used to recover all configuration information and bring the block based data storage subsystem back into working order. This is accomplished by reading all data on all devices on the block based data storage subsystem and reconstructing the configuration, state and all logical to physical mapping information.

Figure 24A:
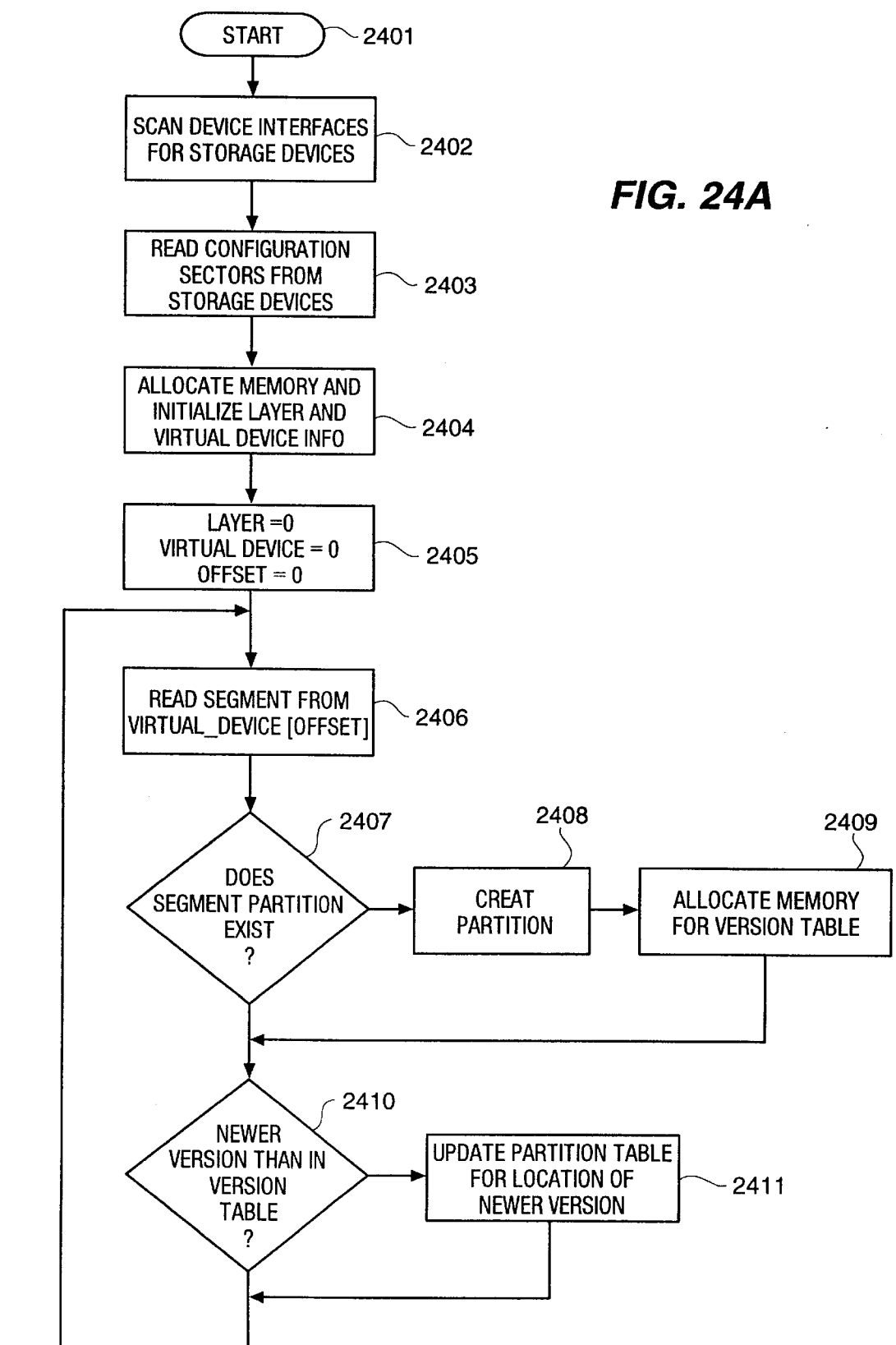
FIGS. 24A and 24B illustrate in flow diagram form the operation of a full system failure recovery function in the block based data storage subsystem.
Figure 24B:
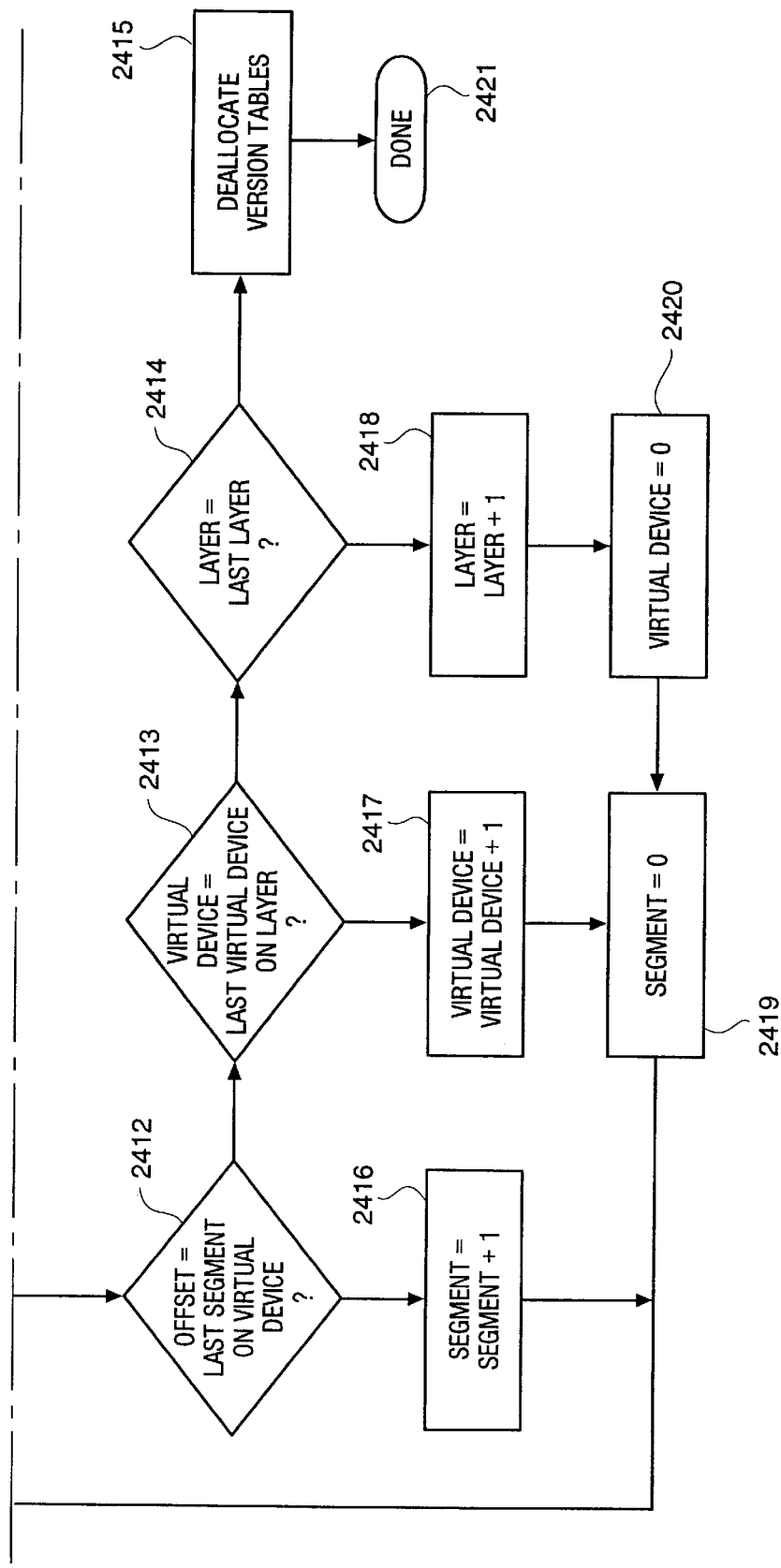

The recovery process is disclosed in flow diagram form in FIGS. 24A, 24B and this process is initiated at step 2401. The CPU at step 2402 scan all the device interfaces for the data storage devices and at step 2403 reads the configuration data sectors from the associated storage devices. At step 2404, the CPU allocates memory, initializes the layer and virtual device information, then set the layer, virtual device and offset numbers to 0 at step 2405. The CPU at step 2406 reads a selected segment from the identified virtual device and then determines at step 2407 whether the partition for this segment exists. If not, at step 2408 the CPU creates a partition and allocates memory at step 2409 for the version table for this partition. At step 2410 the CPU determines whether a newer version of the segment exists in the system than the version listed in the version table. If a newer version exists, at step 2411 the CPU updates the partition table to note the locate of the newer version. At step 2412 the CPU determines whether the selected offset is equal to the last segment on the selected viral device and if not, increments the segment number and returns processing to step 2406 where steps 2406–2412 are repeated until the last segment is repeated. At this juncture, at step 2413 the CPU determines whether the selected virtual device equals the last virtual device and if not, increments the virtual device number at step 2417, sets the segment number to 0 and returns processing to step 2406, where steps 2406–2413 are repeated until the last virtual device is reached. At this juncture, the CPU determines whether the selected layer is the last layer and if not increments the layer number at step 2418, sets the virtual device number to 0 at step 2420, sets the segment number to 0 at step 2419 and returns processing to step 2406, where steps 2406–2414 are repeated until the last layer is reached. CPU at step 2415 deallocates the version tables and exits the process at step 2421.

Summary

To the firmware in the block based data storage subsystem 300, a physical device is an array of data storage locations addressable through a device interface and accessed using a device specific access model. At the beginning of the media of the data storage device, or at the beginning of each piece of media on removable media devices, the first data storage location is used to indicate how the physical device is presently used. The elements of the internal storage hierarchy (partitions, cache, layers, virtual devices, physical devices) are designed to operate independently and with there own functions in a similar manner to the Computer Data Access Hierarchy described above. This is done to allow improvements and changes to be made with minimal if any effect to the other elements in the hierarchy. A partition provides the conversion between the host perspective of a disk drive and the data mapping of the block based data storage subsystem. The primary structure supporting this is the segment table. The segment table points to the location of the data on a virtual device. Each segment table entry has bits to indicate whether the data has changed since it was last backed up and, during a backup, whether it has been backed up. Layers are used to support hierarchical storage management and dynamic expansion of the capacity of the system. A layer is an array of virtual devices. Backup also occurs on a layer by layer level to minimize the performance impact by backing up most likely to be changed data first, i.e. data that is on the first storage layer followed by the next layer and so on. Caching is used to increase performance. A direct table lookup is used via the segment tables to increase performance of the cache search algorithms. Virtual devices are arrays of physical devices which store data in a specific manner (RAID 1, RAID 5 . . . ) to increase performance, cost effectiveness and/or reliability. A list is kept of spare resources. These resources may be automatically used by the system, transparent to the network, to increase performance, reliability and add functionality to the system.

What is claimed:

1. A block-based data storage subsystem for the storage of data for at least one data processor connected thereto, comprising:

a controller connected to said data processor via a data storage device interface;

a plurality of data storage elements, connected to said controller via at least one data storage device interface for the storage of data on said data storage elements in block format;

means, operational in said controller, for segmenting a data file transmitted to said controller by said data processor into a plurality of blocks of predetermined fixed size for storage on at least one of said plurality of data storage elements;

means, operational in said controller, for managing each of said plurality of data storage elements as a plurality of sequentially numbered blocks of data storage of predetermined fixed size;

means for selecting a number of said blocks of data storage, sufficient in number to store said data file, on at least one of said plurality of data storage elements; and means for transmitting said blocks of said data file to said selected blocks of data storage which are located on at least one of said plurality of data storage elements for storage thereon.

2. The data storage subsystem of claim 1 wherein said controller comprises:

a plurality of data processor interface means, each capable of mating with a data storage device interface of said data processor;

a plurality of device interface means, each capable of mating with a data storage device interface of said plurality of data storage elements;

processing means for regulating a flow of data between said plurality of data processor interface means, and said plurality of device interface means;

memory means for the storage of instructions for regulating operation of said processing means; and bus means connected to and interconnecting said processing means, said memory means, said plurality of data processor interface means, and said plurality of device interface means for the exchange of data among these elements.

3. The data storage subsystem of claim 2 wherein said plurality of data storage elements comprises data storage systems of the class including but not limited to: disk drives, tape drives, automated cartridge library systems, optical disk drives, automated optical disk drive library systems.

4. The data storage subsystem of claim 3 wherein said managing means comprises:

means for creating a virtual data storage device which comprises at least two different types of data storage elements.

5. The data storage subsystem of claim 2 wherein said processing means comprises:

means for creating a plurality of virtual data storage devices using one data storage element as a part of each of said plurality of virtual data storage devices.

6. The data storage subsystem of claim 2 wherein at least one of said device interface means comprises:

means for interconnecting a plurality of data storage elements of differing media types.

7. The data storage subsystem of claim 1 wherein said managing means defines at least one virtual data storage device comprising a plurality of sequentially numbered blocks of data storage of predetermined fixed size, which virtual data storage device comprises at least one data storage element not presently part of said data storage subsystem.

8. The data storage subsystem of claim 1 wherein said controller comprises:

means for administering said plurality of data storage elements as a multi-layer hierarchical storage system.

9. The data storage subsystem of claim 8 wherein said controller further comprises:

means for using a single data storage element as part of two of said layers of said multi-layer hierarchical storage system.

10. The data storage subsystem of claim 8 wherein said controller further comprises:

means for migrating data among layers of said multi-layer hierarchical storage system.

11. The data storage subsystem of claim 10 further comprising:

cache memory means for storing most recently used blocks of data for said data processor; and wherein said controller further comprises means for staging only active blocks of a data file to said cache memory means from a hierarchically less senior layer of said multi-layer hierarchical storage system.

12. The data storage subsystem of claim 10 further comprising:

cache memory means for storing most recently used blocks of data for said data processor; and wherein said controller further comprises means for migrating only inactive blocks of a data file from said cache memory to a hierarchically less senior layer of said multi-layer hierarchical storage system.

13. The data storage subsystem of claim 12 wherein said controller further comprises:

means for migrating inactive blocks of a data file among layers of said multi-layer hierarchical storage system as a function of activity for the individual block of data independent of other blocks of data in said data file.

14. The data storage subsystem of claim 1 further comprising:

cache memory means for storing most recently used blocks of data for said data processor; and wherein said controller further comprises:

means for defining a plurality of said blocks of data storage as a data backup device;

means, responsive to a block of data resident in said cache memory means being changed by said data processor, for writing said changed block of data to said data backup device.

15. The data storage subsystem of claim 14 wherein said controller further comprises:

means, responsive to said data processor requesting access to a block of data stored in said cache memory means, which requested block of data resident in said cache memory means has been changed by said data processor and not yet written to said data backup device, for writing said changed block of data to said data backup device prior to providing said data processor obtaining access to said requested block of data.

16. The data storage subsystem of claim 1 wherein said managing means comprises:

means for partitioning each of said plurality of data storage elements into a plurality of sequentially numbered blocks of data storage of predetermined fixed size; and means for creating a plurality of virtual data storage devices from a pool of blocks of data storage, said pool comprising a plurality of blocks of data storage created by said means for partitioning from at least two of said plurality of data storage elements.

17. The data storage subsystem of claim 16 wherein said managing means further comprises:

means, responsive to data files being stored in said data storage subsystem, for dynamically redefining said plurality of virtual data storage devices from said pool of blocks of data storage.

18. The data storage subsystem of claim 17 wherein said managing means further comprises:

means for presenting to said data processor a uniform data storage device image created from a set of blocks of data storage selected from said pool of blocks of data storage, which selected blocks of data storage are from data storage elements of unlike data storage characteristics.

19. A method for the storage of data in a block-based data storage subsystem for at least one data processor connected thereto, said block-based data storage subsystem comprising a controller connected to said data processor via a data storage device interface and a plurality of data storage elements, connected to said controller via at least one data storage device interface for the storage of data on said data storage elements in block format, said method comprising the steps of:

segmenting a data file transmitted to said controller by said data processor into a plurality of blocks of predetermined fixed size for storage on at least one of said plurality of data storage elements;

managing each of said plurality of data storage elements as a plurality of sequentially numbered blocks of data storage of predetermined fixed size;

selecting a number of said blocks of data storage, sufficient in number to store said data file, on at least one of said plurality of data storage elements; and transmitting said blocks of said data file to said selected blocks of data storage which are located on at least one of said plurality of data storage elements for storage thereon.

20. The method of claim 19 wherein said step of managing comprises:

creating a virtual data storage device which comprises at least two different types of data storage elements.

21. The method of claim 19 wherein said step of processing comprises:

creating a plurality of virtual data storage devices using one data storage element as a part of each of said plurality of virtual data storage devices.

22. The method of claim 20 wherein said step of managing defines at least one virtual data storage device comprising a plurality of sequentially numbered blocks of data storage of predetermined fixed size, which virtual data storage device comprises at least one data storage element not presently part of said data storage subsystem.

23. The method of claim 1 further comprising the step of:

administering said plurality of data storage elements as a multi-layer hierarchical storage system.

24. The method of claim 23 further comprising the step of:

using a single data storage element as part of two of said layers of said multi-layer hierarchical storage system.

25. The method of claim 23 further comprising the step of:

migrating data among layers of said multi-layer hierarchical storage system.

26. The method of claim 25 further comprising the step of:

storing in a cache memory most recently used blocks of data for said data processor; and staging only active blocks of a data file to said cache memory means from a hierarchically less senior layer of said multi-layer hierarchical storage system.

27. The method of claim 25 further comprising the step of:

storing in a cache memory most recently used blocks of data for said data processor; and migrating only inactive blocks of a data file from said cache memory to a hierarchically less senior layer of said multi-layer hierarchical storage system.

28. The method of claim 27 further comprising the step of:

migrating inactive blocks of a data file among layers of said multi-layer hierarchical storage system as a function of activity for the individual block of data independent of other blocks of data in said data file.

29. The method of claim 19 further comprising the steps of:

storing in a cache memory most recently used blocks of data for said data processor; and defining a plurality of said blocks of data storage as a data backup device;

writing, in response to a block of data resident in said cache memory being changed by said data processor, said changed block of data to said data backup device.

30. The method of claim 29 further comprising the step of:

writing, in response to said data processor requesting access to a block of data stored in said cache memory, which requested block of data resident in said cache memory has been changed by said data processor and not yet written to said data backup device, for writing said changed block of data to said data backup device prior to providing said data processor obtaining access to said requested block of data.

31. The method of claim 19 wherein said step of managing comprises:

partitioning each of said plurality of data storage elements into a plurality of sequentially numbered blocks of data storage of predetermined fixed size; and creating a plurality of virtual data storage devices from a pool of blocks of data storage, said pool comprising a plurality of blocks of data storage created by said means for partitioning from at least two of said plurality of data storage elements.

32. The method of claim 31 wherein said step of managing further comprises:

dynamically redefining, in response to data files being stored in said data storage subsystem, said plurality of virtual data storage devices from said pool of blocks of data storage.

33. The method of claim 31 wherein said step of managing further comprises:

presenting to said data processor a uniform data storage device image created from a set of blocks of data storage selected from said pool of blocks of data storage, which selected blocks of data storage are from data storage elements of unlike data storage characteristics.

* * * * *